US011973826B2

(12) United States Patent
Beckhoff et al.

(10) Patent No.: US 11,973,826 B2
(45) Date of Patent: Apr. 30, 2024

(54) DATA TRANSMISSION METHOD AND AUTOMATION COMMUNICATION NETWORK

(71) Applicant: Beckhoff Automation GmbH, Verl (DE)

(72) Inventors: Hans Beckhoff, Verl (DE); Holger Büttner, Berlin (DE); Dirk Janssen, Verl (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 17/200,710

(22) Filed: Mar. 12, 2021

(65) Prior Publication Data

US 2021/0203720 A1 Jul. 1, 2021

Related U.S. Application Data

(63) Continuation of application No. PCT/EP2019/081308, filed on Nov. 14, 2019.

(30) Foreign Application Priority Data

Nov. 26, 2018 (DE) .............................. 102018129813

(51) Int. Cl.
*H04L 67/1074* (2022.01)
(52) U.S. Cl.
CPC .................................. *H04L 67/108* (2013.01)
(58) Field of Classification Search
CPC ... H04L 67/108; H04L 67/1074; H04L 67/06; H04L 67/70; H04L 67/75; H04L 47/43;
(Continued)

(56) References Cited

U.S. PATENT DOCUMENTS 5,497,371 A 3/1996 Ellis et al.
5,970,062 A * 10/1999 Bauchot ............ H04W 72/1252
370/395.21
(Continued)

FOREIGN PATENT DOCUMENTS

WO 2006111788 A1 10/2006

OTHER PUBLICATIONS

International Preliminary Report on Patentability dated Oct. 23, 2020 in connection with International Patent Application No. PCT/EP2019/081308, 18 pages including English translation.
(Continued)

*Primary Examiner* — Thu Ha T Nguyen
(74) *Attorney, Agent, or Firm* — Dorsey & Whitney LLP

(57) ABSTRACT

At least one distribution node with a plurality of input/output interfaces is provided in an automation communication network. Data is exchanged via telegrams with priority levels. The distribution node interrupts transmission of a telegram having a first priority level if a telegram with a second, higher priority level is received. The distribution node terminates the interrupted telegram, which forms a first fragment defined by sending first fragmentation information at the end of the first fragment. A part that has not been sent forms a second fragment. The distribution node stores the second fragment together with second fragmentation information. After sending the telegram having the second, higher priority level, the distribution node sends the second fragment together with the second fragmentation information. A node, for which the telegram having the first priority level is intended, assembles the first and second fragments on the basis of the first and second fragmentation information.

20 Claims, 8 Drawing Sheets

(58) Field of Classification Search
CPC ....... H04L 47/431; H04L 47/10; H04L 9/085; H04L 9/3072; H04L 12/2838; H04L 212/565; H04L 212/5651; H04L 212/5652
USPC .................................................. 709/246, 205
See application file for complete search history.

(56) References Cited

U.S. PATENT DOCUMENTS

| | | | | |
|---|---|---|---|---|
| 6,490,276 | B1* | 12/2002 | Salett | H04Q 3/0029 370/395.2 |
| 6,519,263 | B1* | 2/2003 | Huth | H04L 47/2416 370/444 |
| 6,721,335 | B1* | 4/2004 | Gregg | H04L 12/40032 370/473 |
| 6,795,435 | B1 | 9/2004 | Jouppi et al. | |
| 7,215,637 | B1* | 5/2007 | Ferguson | H04L 47/10 370/230.1 |
| 7,551,173 | B2* | 6/2009 | Cao | G06T 11/40 382/199 |
| 7,688,727 | B1* | 3/2010 | Ferguson | H04L 63/0227 370/230.1 |
| 7,714,865 | B2* | 5/2010 | Faggion | G06T 11/40 345/441 |
| 7,936,818 | B2* | 5/2011 | Jayant | H04N 19/103 382/235 |
| 8,189,576 | B2* | 5/2012 | Ferguson | H04L 47/10 370/392 |
| 8,892,785 | B2* | 11/2014 | Papenfort | H04L 41/0803 710/15 |
| 10,873,536 | B2* | 12/2020 | Bunte | H04L 49/206 |
| 11,233,768 | B1* | 1/2022 | Flack | H04L 61/30 |
| 11,234,059 | B1* | 1/2022 | Ram | H04N 21/2393 |
| 2001/0055311 | A1* | 12/2001 | Trachewsky | H04L 1/20 370/445 |
| 2002/0041592 | A1 | 4/2002 | Van et al. | |
| 2004/0240451 | A1* | 12/2004 | Lee | H04L 12/2836 370/395.5 |
| 2007/0171928 | A1* | 7/2007 | Kim | H04L 47/12 370/535 |
| 2009/0161678 | A1* | 6/2009 | Huang | H04L 69/12 370/395.5 |
| 2009/0213848 | A1* | 8/2009 | Jeon | H04L 69/26 370/389 |
| 2010/0211201 | A1* | 8/2010 | Papenfort | H04L 12/407 700/95 |
| 2011/0317587 | A1* | 12/2011 | Lida | H04L 49/557 370/254 |
| 2012/0002680 | A1* | 1/2012 | Naouri | H04L 47/245 370/428 |
| 2012/0102144 | A1* | 4/2012 | Fritsche | H04L 69/26 709/217 |
| 2013/0016724 | A1* | 1/2013 | Thaler | H04L 47/245 370/393 |
| 2015/0117177 | A1* | 4/2015 | Ganga | H04L 12/40163 370/216 |
| 2015/0244632 | A1* | 8/2015 | Katar | H04B 3/54 370/230 |
| 2016/0034305 | A1* | 2/2016 | Shear | H04L 47/70 707/722 |
| 2016/0224951 | A1* | 8/2016 | Hoffberg | G06Q 20/308 |
| 2017/0078367 | A1* | 3/2017 | Dress | H04L 49/15 |
| 2017/0092331 | A1* | 3/2017 | Eppolito | H04N 21/47205 |
| 2017/0374241 | A1* | 12/2017 | Nunes | G06Q 30/0241 |
| 2018/0007007 | A1* | 1/2018 | Bansal | H04L 63/0263 |
| 2018/0091330 | A1* | 3/2018 | El Abbouti | H04L 12/433 |
| 2018/0092085 | A1* | 3/2018 | Shaheen | H04W 36/0022 |
| 2018/0123718 | A1* | 5/2018 | Gao | H04J 3/1652 |
| 2018/0191751 | A1* | 7/2018 | El-Moussa | G06F 16/9024 |
| 2019/0245707 | A1* | 8/2019 | Coombes | H04L 12/12 |
| 2019/0386969 | A1* | 12/2019 | Verzun | G06F 21/606 |
| 2020/0092137 | A1* | 3/2020 | Jerolm | H04L 12/42 |
| 2020/0314052 | A1* | 10/2020 | Iyer | H04L 51/226 |
| 2020/0314960 | A1* | 10/2020 | Basu Mallick | H04W 88/06 |
| 2020/0344185 | A1* | 10/2020 | Singaraju | H04L 51/02 |
| 2021/0203720 | A1* | 7/2021 | Beckhoff | H04L 12/40163 |
| 2021/0281666 | A1* | 9/2021 | Beckhoff | H04L 49/9057 |
| 2021/0314238 | A1* | 10/2021 | Cioffi | H04L 41/5006 |
| 2021/0352682 | A1* | 11/2021 | Zheng | H04W 72/1231 |
| 2022/0345839 | A1* | 10/2022 | Proctor, Jr. | H04N 21/8106 |
| 2022/0350683 | A1* | 11/2022 | Surendran | G06F 9/3887 |
| 2022/0414455 | A1* | 12/2022 | Collins | G06F 18/25 |
| 2023/0025245 | A1* | 1/2023 | Grover | G06N 3/08 |
| 2023/0123811 | A1* | 4/2023 | Collins | G06N 3/105 706/17 |

OTHER PUBLICATIONS

International Search Report and Written Opinion dated Dec. 19, 2019 in connection with International Patent Application No. PCT/EP2019/081308, 36 pages including English translation.

"IEEE Standard for Ethernet, Amendment 5: Specification and Management Parameters for Interspersing Express Traffic", IEEE Std. 802.3br 2016 (Jun. 30, 2016) 58 pages.

Examination report dated Jul. 15, 2019 in connection with German patent application No. DE 10 2018 129 813.7, 16 pages including English translation.

Mikosalek et al. "Segmentation of standard Ethernet messages in the time-triggered Ethernet," Emerging Technologies and Factory Automation 2008, IEEE, Piscataway, NJ, USA (Sep. 15, 2008) 8 pgs.

"EtherCAT—the Ethernet Fieldbus," EtherCAT Technology Group, Nov. 2012, 21 pages.

* cited by examiner

Fig. 3

DATA TRANSMISSION METHOD AND AUTOMATION COMMUNICATION NETWORK

CROSS-REFERENCE TO RELATED APPLICATIONS

This is a continuation of International Patent Application PCT/EP2019/081308, filed 14 Nov. 2019, DATA TRANSMISSION METHOD AND AUTOMATION COMMUNICATION NETWORK, and claims priority to German Patent Application DE 10 2018 129 813.7, filed Nov. 26, 2018, entitled DATENÜBERTRAGUNGSVERFAHREN UND AUTOMATISIERUNGSKOMMUNIKATIONSNETZWERK, each of which is incorporated by reference herein, in the entirety and for all purposes.

FIELD

The present invention relates to a method for transmitting data in an automation communication network. The present invention further relates to an automation communication network embodied for transmitting data.

BACKGROUND

A so-called "local area network" (LAN) is a spatially limited network in which various network components are coupled ton one another. The network components may be one or a plurality of servers and work subscribers, so-called nodes, which are connected to one another via communication lines in the form of coaxial, fiber optic or twisted pair cables. Communication between the network components within the LAN is based on network protocols.

The Ethernet protocol is the most widely used standard of network protocols for an LAN. Ethernet telegrams may comprise a user data block with a length of 1500 bytes and enable telegram transfer rates between the individual network components within the LAN of several of gigabytes/second, wherein the telegrams are transmitted in packets. As the so-called "Industrial Ethernet", the Ethernet protocol is also used in industrial production plants. In automation technology, the Ethernet protocol may e.g. be used to regulate the exchange of data in manufacturing, building and process automation with regard to control tasks and to guarantee the real-time capability of the system.

The automation communication networks used in automation technology generally correspond to so-called "field-bus systems". Field-bus systems are bus systems in which decentrally arranged devices of a machine periphery such as input and/or output modules, drives and operating terminals are connected to control units via the field-bus system. A shared transmission channel (for example in the form of the field bus or as a radio link) is available for transmitting data. If several subscribers send out telegrams simultaneously, it must be possible for the subscribers to share the transmission channel by mutual agreement. One such possibility is the application of the so-called "master-slave principle".

As a rule, the control units on the field bus form the active bus subscribers, also referred to as "master subscribers". The master subscribers have the access authorization of the field-bus system and define the data traffic on the field bus in the form of telegrams. The passive field-bus subscribers, also referred to as "slave subscribers", usually correspond to the machine peripherals. The slave subscribers do not have access authorization and may only acknowledge received data or telegrams or transmit data or telegrams upon request of a master subscriber.

In automation communication networks, distribution nodes, so-called "switches", are often used to connect the individual network segments with network components and ensure that the data or, respectively, telegrams arrive quickly at their target within the network segments. The network segments may form part of a coherent automation communication network and be logically and/or physically separate from the rest of the automation communication network. The telegrams to be transmitted in the automation communication network may be telegrams with a first and a second priority level, wherein the second priority level may be of higher significance than the first priority level. In addition to the two priority levels, other priority levels are also conceivable. The higher value for the second priority level may be realized by using a higher value or a lower value than the value for the first priority level, so that a higher value may interrupt a low value (and vice versa). For example, the telegram having the second priority level may be a so-called "cyclic real-time telegram" relevant for the control of the automation system and include cyclic input/output data of the subscribers. Furthermore, the telegram having the first priority level may e.g. be embodied as an "acyclic non-real-time telegram" and include acyclic parameter or status data of the subscribers.

For forwarding cyclic real-time telegrams, a routing table, also referred to as "routing list", is stored in the distribution node, the routing list comprising a telegram identifier, e.g. in the form of a MAC address, an input/output interface and a transmission time. This procedure is used for example in PROFINET IRT. Alternatively, a simplified routing list may be created in the distribution node, which includes a priority level for each cyclic real-time telegram, the telegram identifier in the form of the MAC address, and the input/output interface. Furthermore, time windows are defined for each input/output interface and priority level for which the telegrams with the corresponding priority levels may be sent. This procedure is used for the TSN (Time Sensitive Networking) procedure.

In both cases, a configuration of the distribution node regarding the time windows is required. In an automation communication network, in which a plurality of distribution nodes are used, the calculation of the schedule becomes more complicated the more distribution nodes are used in the automation communication network. A change of the state of the automation communication network during operation, which may be caused by the addition (a so-called "hot-plug") of additional devices or network parts, also requires a new calculation of the schedule.

The "IEEE standard 802.3br for Ethernet, Amendment 5: Specification and Management Parameters for Interspersing Express Traffic, 2016" discloses a procedure that distinguishes between "Express Traffic" and "Preemptable Traffic". Express Traffic may interrupt Preemptable Traffic, i.e. two telegram priority levels are possible, wherein the second priority level may be embodied with a higher valence, so that telegrams with the first priority level may be interrupted in this way. In the disclosed method, the distribution node operates according to the so-called "store-and-forward principle". According to the store-and-forward principle, the distribution node does not forward a telegram until the distribution node has received the telegram completely. If the distribution node receives an Express Traffic telegram with the higher prioritized second priority level while sending a Preemptable Traffic telegram with the first priority level, the distribution node interrupts sending the Preemptable Traffic telegram with the first priority level, which thus forms a first fragment.

The remaining part of the Preemptable Traffic telegram, which has not yet been sent by the distribution node and forms a second fragment, is not forwarded by the distribution node until the distribution node has received the second fragment in full and a data transmission path on which the Preemptable Traffic and Express Traffic telegrams are transmitted is free. The second fragment of the Preemptable Traffic with the first priority level may be interrupted again during transmission by the distribution node and split into further sub-fragments when the distribution node has again received a higher prioritized Express Traffic telegram. The disclosed procedure leads to disadvantageous delays in forwarding the corresponding telegram fragments, because the forwarding process of the telegram fragments is not initiated by the distribution node until the distribution node has fully received the individual telegram fragments of the Preemptable Traffic with the first priority level. Thus, an immediate forwarding of the telegram fragments of the Preemptable Traffic by the distribution node is not provided.

SUMMARY

The present invention provides a method for transmitting data in an automation communication network having at least one distribution node, which efficiently organizes the throughput of telegrams in the distribution node and reduces time delays when forwarding the telegrams. Furthermore, an improved automation communication network is specified.

EXAMPLES

According to an aspect, a method for transmitting data in an automation communication network comprising at least one distribution node having a plurality of input/output interfaces each of which is connected to a network segment is provided.

The network segment comprises at least one subscriber, wherein data exchange between the subscribers takes place in the form of telegrams. Priority levels are assigned to the telegrams. The transmission of a telegram having a first priority level on an input/output interface is interrupted by the at least one distribution node when the at least one distribution node has received a telegram having a second priority level which comprises a higher valence than the first priority level, on a further input/output interface. Said at least one distribution node completes the interrupted telegram having the first priority level forming a first fragment in a defined manner by said at least one distribution node transmitting a first fragmentation information at the end of said first fragment.

A remaining portion of the telegram having the first priority level, which has not yet been transmitted by the at least one distribution node, forms a second fragment. The at least one distribution node generates a second fragmentation information for the second fragment. The at least one distribution node buffers the second fragment together with the second fragmentation information. The at least one distribution node, after sending of the telegram having the second priority level on the input/output interface, transmits the second fragment of the telegram having the first priority level together with the second fragmentation information on the input/output interface. An addressed subscribe, for which the telegram having the first priority level is intended, reassembles the first fragment and the second fragment of the telegram having the first priority level on the basis of the first and second fragmentation information.

According to a further aspect, an automation communication network, comprising at least one distribution node having a plurality of input/output interfaces each of which is connected to a network segment is provided. The network segment comprises at least one subscriber. Data exchange between the subscribers takes place in the form of telegrams, wherein priority levels are assigned to the telegrams. The at least one distribution node is embodied to interrupt the transmission of a telegram having a first priority level on an input/output interface if the at least one distribution node has received a telegram with a second priority level, which comprises a higher valence than the first priority level, on a further input/output interface. Said at least one distribution node is embodied to complete the interrupted telegram having the first priority level forming a first fragment in a defined manner by said at least one distribution node sending a first fragmentation information at the end of said first fragment.

A remaining portion of the telegram having the first priority level, which has not yet been transmitted by the at least one distribution node, forms a second fragment, wherein the at least one distribution node is adapted to generate second fragmentation information for the second fragment. The at least one distribution node is embodied to buffer the second fragment together with the second fragmentation information. Said at least one distribution node is embodied to transmit, after transmitting the telegram having the second priority level on the input/output interface, the second fragment of the telegram with the first priority level together with the second fragmentation information on the input/output interface. An addressed subscriber, for which the telegram having the first priority level is intended, reassembles the first fragment and the second fragment of the telegram having the first priority level on the basis of the first and second fragmentation information.

According to another aspect, a distribution node, having input/output interfaces, for an automation communication network is provided. Data exchange between subscribers of the automation communication network takes place in the form of telegrams with assigned priority levels. The distribution node interrupts the transmission of a telegram having a first priority level on an input/output interface, when the distribution node has received a telegram having a second priority level which comprises a higher valence than the first priority level, on a further input/output interface. Said distribution node completes the interrupted telegram having the first priority level forming a first fragment in a defined manner by said distribution node transmitting a first fragmentation information at the end of said first fragment.

A remaining portion of the telegram having the first priority level, which has not yet been transmitted by the distribution node, forms a second fragment. The distribution node generates a second fragmentation information for the second fragment. The distribution node buffers the second fragment together with the second fragmentation information. The distribution node, after sending of the telegram having the second priority level on the input/output interface, transmits the second fragment of the telegram having the first priority level together with the second fragmentation information on the input/output interface.

BRIEF DESCRIPTION OF THE DRAWINGS

The properties, features and advantages of the present invention described above, as well as the way in which these are achieved, become clearer and more understandable in connection with the following description of embodiment examples which are explained in more detail in connection with the schematic drawings, in which:

FIG. 3 shows a first and second telegram structure of a first unfragmented telegram, a third and fourth telegram structure of a second unfragmented telegram, and a fifth and sixth telegram structure of the first fragmented telegram which forms the first fragment of the first telegram;

DETAILED DESCRIPTION

Figure 1:
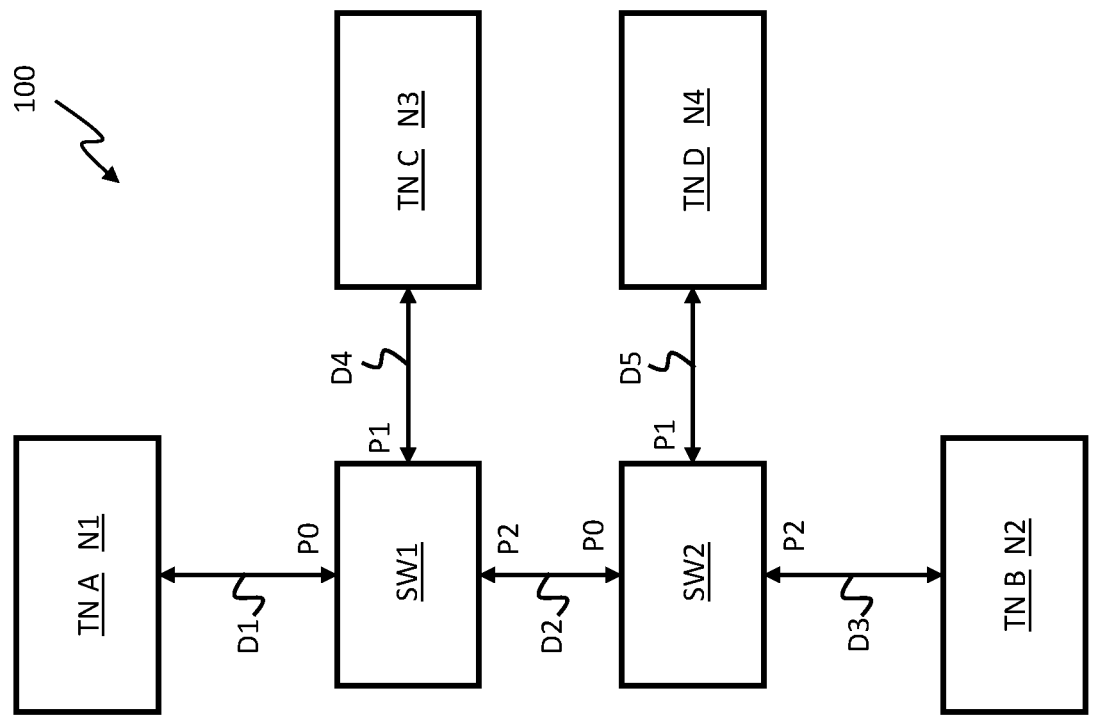
FIG. 1 shows a schematic structure of an automation communication network with a plurality of distribution nodes and network segments.

The following figures describe an embodiment example of a method for transmitting data in an automation communication network, which may be used for example in the context of manufacturing, building and process automation. In this context, the indication of use is not to be understood as being restrictive since the invention may also be applied in other areas of the automation communication network, in which at least one subscriber is arranged in a network segment and exchanges data with another subscriber which is for example arranged in another network segment. Furthermore, the invention is not limited to the execution example described below.

It is to be noted that the figures are only schematic in nature and not to scale. In this sense, components and elements shown in the figures may be oversized or scaled down for better understanding. It is also pointed out that the reference signs in the figures remain the same if the elements and/or components and/or sizes are the same.

Automation communication networks are usually implemented as field-bus systems in which the subscribers are networked with one another via the field bus. The subscribers may exchange data with control units, wherein real-time capable network protocols are generally used. Often the data exchange between the subscribers on the field bus is controlled in the form of a master-slave management principle. The active bus subscribers, also referred to as master subscribers, correspond to the control units that determine and coordinate the transmission of data on the field bus. In contrast, the passive bus subscribers also referred to as slave subscribers not having their own bus access authorization, in contrast, form the devices of the machine periphery. Thus, a passive bus subscriber may only receive messages, acknowledge them and transmit data or telegrams upon request of the master subscriber. The devices of the machine periphery may e.g. correspond to input and/or output components that connect the sensors or actuators of a machine or a system to the field bus. Alternatively, the input and/or output components may be integrated directly into the sensors or actuators of the machine or plant.

On the field bus, telegrams with assigned priority levels are transmitted between the above mentioned subscribers. In this context, the individual network segments with subscribers are connected to one another by one or more distribution nodes, which may be implemented as so-called "switches". The distribution nodes also serve to coordinate the data exchange of the subscribers in the network segments and to route the telegrams to their target on time. The corresponding distribution nodes have a plurality of input/output interfaces, each of which is connected to a network segment, wherein the network segment has at least one subscriber. The distribution node is embodied to receive the telegrams with the first and second priority level on another input/output interface and to send them on an input/output interface.

The distribution node sends the telegram with the first priority level on the input/output interface, and interrupts the transmission of the telegram having the first priority level when the distribution node on the further input/output interface has received the telegram with the second priority level, wherein the telegram with the second priority level has a higher valence and, for example, a higher value than the first priority level. Apart from the first and the second priority level, telegrams with further priority levels are conceivable, as well. For example, the telegram having the first priority level may be embodied as an acyclic telegram, i.e. a non-real-time telegram, while the telegram with the second priority level may form a cyclic telegram, i.e. a real-time telegram, which is relevant for the control of the automation system.

A cyclic control process in automation technology may be initiated by the master subscriber and may be carried out by data exchange between the master subscriber and the slave subscriber via the field bus. For this purpose, the master subscriber transmits the output data in the form of the telegram having the second priority level on the field bus, wherein the slave subscriber takes the output data assigned to it from the telegram having the second priority level in order to process the output data into data, which in turn are transmitted back to the master subscriber and serve as input data for the master subscriber for the next cyclic control process.

Acyclic telegrams, on the other hand, are telegrams that do not repeat cyclically on the field bus and are therefore not relevant in real time. The telegram having the first priority level may therefore e.g. contain parameterization and configuration data or diagnostic messages.

Field-bus systems, the management structure of which is based on the master-slave principle, may be operated by various network protocols. The Ethernet protocol, for example, is the most widely used standard of network protocols for a local area network (LAN). Ethernet telegrams may comprise a user data block having a length of 1500 bytes and enable telegram transfer rates between the individual network components within the LAN of a plurality of gigabytes/second. In the form of the so-called "Industrial Ethernet", the Ethernet protocol is also used in industrial production plants or machines of an automation system, wherein the Ethernet protocol is intended to guarantee the real-time requirements of the automation system. The EtherCAT protocol, for example, is such a protocol based on the Ethernet protocol technology and may be used in real-time capable automation systems.

The special feature of the EtherCAT protocol is that the processing of the user data in the user data block of the EtherCAT telegram, which may include the above-mentioned telegrams with the first and second priority level, is already performed by the slave subscriber during the respective telegram passage. In this way, the EtherCAT protocol may be used to provide fast processing of the data in the automation communication system which may e.g. be advantageous for real-time systems.

The EtherCAT telegram comprises datagrams, which each have a control data field and a user data field. The control data field comprises a command field which informs the slave subscriber in which way it should process the user data of the telegrams with first and second priority level: For example, whether the slave user is to insert data into the user data field of the telegrams with the first and second priority level in a write operation, or whether it is to first extract data from the user data field and then insert them into the user data field in a read/write operation, or whether the slave user is only to extract data from the user data field in a read operation. The control data field also has an address field. In the address field, the data area in the slave subscriber is defined by which the slave subscriber is to exchange data when passing through the user data field.

After receiving the control data field in the datagram of the EtherCAT telegram the slave subscriber starts to evaluate the command field and the address field. If the slave subscriber is addressed, it extracts the output data intended for it from the user data field in a read or in a read/write datagram while the datagram passes through the slave subscriber in the EtherCAT telegram. If the datagram is a read or a write datagram, the corresponding slave subscriber inserts the input data into the user data field in the datagram. The processing of the datagrams by the slave subscribers during passage only slightly delays the EtherCAT telegram.

The invention is described below using EtherCAT telegram traffic. However, another Ethernet protocol may also be used, which may be applied in real-time systems. Moreover, the proposed method may be realized with a standard Ethernet protocol. Furthermore, the proposed automation network is not limited to an automation network with a hierarchical master-slave management structure.

In the automation communication network, the telegrams are each assigned first and second priority levels, respectively, wherein the second priority level has a higher value than the first priority level. Subsequently, the higher valence of the second priority level may e.g. be formed in a higher value of the second priority level than the value of the first priority level. However, the opposite case is also conceivable wherein the second priority level may have a lower value than the first priority level. Due to the priority levels of the telegrams, the distribution node may interrupt the transmission of the telegram with the first priority level on the input/output interface if the distribution node has received the higher priority telegram with the second priority level on the further input/output interface. The distribution node completes the telegram with the first priority level, which forms a first fragment of the telegram, in a defined manner by the distribution node sending a first fragmentation information at the end of the first fragment.

A remaining part of the telegram with the first priority level which has not yet been sent by the distribution node forms the second fragment of the telegram. The distribution node creates a second fragmentation information for the second fragment and stores the second fragmentation information together with the second fragment. The distribution node may quickly assign the second fragment upon receipt on the further input/output interface based on the stored information.

After sending the telegram with the second priority level on the input/output interface, the distribution node sends the second fragment of the telegram with the first priority level together with the second fragmentation information. In addition, both the first and the second fragment may have a checksum field with a checksum calculated by the distribution node by the already sent parts, i.e. the sent data, of the corresponding fragments. If the distribution node calculates the checksum for each fragment and sends the checksum together with the respective telegram to the subscriber for which the telegram is intended, the addressed subscriber may also perform a checksum calculation for the individual fragments and compare it with the checksum comprising the fragments. If the two checksums do not match, an error in the data transmission, e.g. the loss of a fragment or a sub-fragment, may be quickly located by the addressed subscriber and/or another distribution node.

The addressed subscriber which is the recipient of the telegram having the first priority level reassembles the first and second fragment of the telegram having the first priority level on the basis of the first and second fragmentation information, since the first and second fragmentation information allow the first and second fragment to be assigned to the telegram having the first priority level. The recipient may use the first fragmentation information to recognize via a fragment number whether all fragments of the telegram have been transmitted and the recipient has received all fragments of the telegram with the first priority level. In addition, the recipient may receive an information on the fragment number of the second fragment. Apart from the fragment number, the first fragmentation information may include the value of the priority level of the first fragment as well as the consecutive number. The second fragmentation information of the second fragment, as well, may include the value of the priority level and the consecutive number in addition to the fragment number, which may have the value of the fragment number of the first fragment.

The recipient recognizes fragmentation of the telegram by the first fragmentation symbol at the end of the interrupted telegram, provided that the recipient does not comprise a standard Ethernet controller but is able to interpret and process the special fragmentation symbol. The fragment number of the second fragment does not necessarily have to be sent by the at least one distribution node to identify the fragmentation as the recipient may recognize the fragmentation of the telegram by the first fragmentation symbol at the end of the first fragment.

As an alternative to the above-mentioned fragment number of the second fragment, the first fragmentation information of the first fragment may also be realized in form of a reserved bit in a data field containing the first fragmentation information. The reserved bit may comprise two states, by which it may be determined whether the first fragment is actually the first fragment of the telegram. For example, state one or state zero of the reserved bit may be used for this purpose.

The distribution node may thus indicate the fragmentation of the telegram having the first priority level on the one hand by the first fragmentation symbol at the end of the first fragment and by a second fragmentation symbol at the beginning of a first sub-fragment of the second fragment. On the other hand, the distribution node may indicate a possible fragmentation of the telegram having the first priority level by setting a fragmentation TAG at the beginning of the telegram having the first priority level which has a type field for a used protocol within the user data of the first fragment. The fragmentation TAG itself does not yet indicate actual fragmentation of the telegram, but the first fragmentation information at the end of the interrupted telegram that forms the first fragment indicates the actual fragmentation of the telegram.

Alternatively, the information about the possible fragmentation of a telegram having the first priority level may be indicated by a special target address and/or a special sender address. In this case, however, the target and/or sender address may no longer be completely used for routing, i.e., sending the telegram. This is possible with a telegram which is e.g. an EtherCAT telegram.

The distribution node finally interrupts the telegram having the first priority level with the fragmentation TAG in such a way that the first fragment has a minimum length during the interruption process and indicates the actual fragmentation of the telegram by the first fragmentation information, which may have the fragment number of the second fragment at the end of the first fragment. Furthermore, the first fragmentation information may include the value of the priority level of the first fragment as well as the consecutive number. The second fragmentation information may also include the value of the priority level of the second fragment and the consecutive number for the second fragment of the telegram with the fragmentation TAG.

Depending on which type of Ethernet controller or, respectively, network card is used in the receiving subscriber, when using a non-standard Ethernet controller capable of interpreting such a fragmentation symbol provided in the form of an additional symbol other than the conventional symbols provided for encoding the bytes of the telegram transmitted by the Ethernet protocol, the distribution node may indicate fragmentation of the telegram by the first and the second fragmentation symbol. In a standard Ethernet controller that requires Ethernet telegrams having a minimum length of 64 bytes for processing, the distribution node may indicate the fragmentation by the first fragmentation information and dispense with the additional fragmentation symbols in the fragments.

Fragmentation of the telegram having the first priority level is usually necessary for the return path of the telegram transmission. On the forward run, the first subscriber, i.e. the master subscriber in the first network segment, determines when the telegram with the second priority level is transmitted via the distribution node and/or the distribution nodes to the second subscriber, i.e. the slave subscriber in the second network segment. Due to this definition, telegram collisions may be avoided. However, this is different if the telegram with the second priority level or, respectively, the telegram with the first priority level is sent to the master subscriber on the return path. Here, collisions may be avoided if the corresponding distribution node fragments the low-priority telegram, i.e. the telegram with the first priority level, in order to forward the higher prioritized telegram with the second priority level with priority.

It is possible to identify a telegram by the priority level assigned to the telegram and the consecutive number. In particular, a combination of the priority level assigned to the respective fragment not yet completely transmitted and the consecutive number must be unique. The consecutive number may be omitted if only one telegram having a certain priority level may be interrupted at a time via the input/output interface of the at least one distribution node which is intended as the transmission interface. In this case, the consecutive number would be required for the recipient to recognize whether all fragments of the telegram have been completely transmitted. For the first fragment, the consecutive number may be at the beginning or at the end of the first fragment. For the second fragment and/or further fragments, the consecutive number must be located at the beginning of the second fragment and/or further fragments.

Furthermore, a fragment number which may e.g. be part of the second fragmentation information is only required for the second fragment or further fragments, respectively, wherein the fragment number may be located at the beginning and/or at the end of the second fragment or at the beginning and/or at the end of the further fragments, respectively. In addition, the fragment number may also be transmitted for the first fragment from the at least one distribution node and may e.g. be part of the first fragmentation information. The at least one distribution node may evaluate the fragment number, but this is not mandatory. However, the receiving subscriber must be capable of processing the fragment number of the individual fragments in order to recognize whether the fragments of the telegram have all been completely transmitted to the recipient or whether one of the fragments is missing.

For example, a last fragment or a last sub-fragment, in case of multiple fragmentation of a fragment, may be indicated with the first fragmentation information using a zero value of the fragment number. Furthermore, the mentioned information may also be indicated using the reserved bit mentioned above in the data field provided for the first fragmentation information. Boolean values in the form of zero and one for the last fragment or the last sub-fragment may be realized by the two states of the bit.

With this approach, the telegram traffic in the automation communication network may be optimized. The core of the proposed method, automation communication network and distribution node is the optimal use of the data transmission path between the subscribers by forwarding the telegrams from the distribution node without having been completely received by the distribution node prior thereto, wherein the distribution node interrupts the transmission of the low-priority telegrams due to prioritized, higher prioritized telegrams and fragments the low-priority telegrams. Furthermore, the distribution node may flexibly adapt the fragmentation of the low-priority telegrams to the subscribers used in the automation communication network, in particular their comprehensive Ethernet controllers, in order to provide improved compatibility of the individual components. The invention also offers the advantage of minimizing dead time during telegram transmission by efficiently transferring the telegrams in fragments from the distribution node. The present invention is advantageously suited for the transmission of the highly prioritized telegrams, which may be forwarded without delay from the at least one distribution node. Also, the bandwidth of the automation system may be used in the best possible way by fragmentation of the low-priority telegrams.

According to an embodiment, a method for transmitting data in an automation communication network with at least one distribution node and a corresponding automation communication network are proposed. The at least one distribution node has a plurality of input/output interfaces, each connected to a network segment. The network segment has at least one subscriber, with data exchange between the subscribers taking place in the form of telegrams. The telegrams are assigned priority levels. The at least one distribution node interrupts the transmission of a telegram with a first priority level on an input/output interface if the at least one distribution node has received a telegram with a second priority level, which has a higher valence than the first priority level, on another input/output interface. The at least one distribution node terminates the interrupted telegram with the first priority level, which forms a first fragment, in a defined manner by the at least one distribution node sending a first fragmentation information at the end of the first fragment. A remaining part of the first-priority level telegram that has not yet been sent by the at least one distribution node forms a second fragment. The at least one distribution node uses this to generate a second fragmentation information for the second fragment. The at least one distribution node buffers the second fragment together with the second fragmentation information. After sending the telegram with the second priority level on the input/output interface, the at least one distribution node sends the second fragment of the telegram with the first priority level on the input/output interface together with the second fragmentation information. An addressed subscriber for which the telegram with the first priority level is intended, assembles the first fragment and the second fragment of the telegram with the first priority level on the basis of the first and the second fragmentation information.

The proposed method may have an advantageous effect on optimized data transmission in the automation communication network. This is because the fragmentation may cause the transmission of a telegram with the first priority level to be interrupted by the at least one distribution node when the at least one distribution node has received a telegram with a second priority level, wherein the second priority level may be of higher valence than the first priority level. Therein, the higher valence of the second priority level may be realized by a higher valence than the value for the first priority level so that a higher value may interrupt a lower value or, respectively, so that a lower value may interrupt a higher value. The telegram or fragment also includes the priority level at the start of the telegram or fragment. In an automation communication network in which the at least one distribution node cannot interrupt a telegram with the first priority level in comparison to when the at least one distribution node has received a telegram with the second priority level, the at least one distribution node first fully sends the telegram with the first priority level to another distribution node or to the recipient before the at least one distribution node forwards the higher prioritized telegram.

Specifically in a real-time capable automation communication network it is necessary to ensure that highly prioritized telegrams, which may be used for control tasks or commands within the automation communication network for machines are e.g. sent and received at defined times. For this purpose, the at least one distribution node terminates the interrupted telegram in a defined manner by the at least one distribution node sending the first fragmentation information at the end of the first fragment. The remaining part of the telegram with the first priority level, which has not yet been sent by the at least one distribution node, forms the second fragment and contains the second fragmentation information.

After sending the telegram with the second priority level, the at least one distribution node sends the second fragment of the telegram with the first priority level together with the second fragmentation information. The addressed subscriber for which the interrupted telegram is intended may detect the fragmentation by the above-mentioned identification of the interrupted telegram and, based on the first and second fragmentation information, reassemble the telegram with the first priority level easily, reliably and quickly. Thus the first and second fragmentation information allows to assign the fragments to result in the complete telegram. The first and the second fragmentation information may be embodied in such a way that the first fragmentation information of the first fragment refers to the second fragmentation information of the second fragment and vice versa.

An additional advantage of the proposed method, automation network and distribution node is that a header of the telegram, i.e. an initial section of the telegram having the first priority level comprises instructions which may be recognized and processed by the addressed subscriber for which the telegram is intended, and the header of the telegram itself is embodied in a compact manner. In particular, the at least one distribution node has to generate the header of the telegram with the first priority level only once and does not have to extend it for each further distribution node which may be located on a data-transmission link up to the addressed subscriber, by additional data fields which are assigned to the respective distribution node for processing the telegram with the first priority level. The at least one distribution node may also forward the telegrams or, respectively fragments without having received them completely prior thereto. This may be advantageous in reducing unnecessary waiting times for forwarding the telegrams and offer an optimal use of the available bandwidth in the automation communication network.

In another embodiment, the at least one distribution node sends a checksum field at the end of the first fragment. The checksum field has a checksum which is calculated over the already sent part of the first fragment. By transmitting the checksum field along with the checksum, the recipient which calculates a checksum may compare the two sums and, in case of a mismatch, quickly determine an error that occurred during data transmission, e.g. the loss of individual data packets. The checksum may also be calculated for further fragments over the already sent data of the telegram. For example, if the telegram is an Ethernet frame, the preamble and the Start of Frame Delimiter (SFD), i.e. the two data fields indicating the start of the actual Ethernet frame, are not part of the Ethernet frame and are not taken into account when calculating the checksum.

The checksum calculated for the further fragments may be sent along with the transmission of the respective fragments as well as the checksum described above for the first fragment. Thus, a faulty data transmission may be localized advantageously and quickly, particularly in comparison to an embodiment which does not provide a continuous transmission of the checksums of the fragments during the transmission.

A telegram may be identified by the assigned priority level and a consecutive number. These may be part of the first or the second fragmentation information. The consecutive number may be regenerated for each input/output interface of the at least one distribution node on which the at least one distribution node forwards the telegrams and fragments. Thus, the consecutive number is unique only on one data link between a subscriber and the at least one distribution node or, if multiple distribution nodes are provided, between the corresponding distribution nodes. A combination of the priority level assigned to the respective fragment not yet completely transmitted and the consecutive number must be unique. The consecutive number may be omitted if only one telegram with a certain priority level may be interrupted at a time via the input/output interface of the at least one distribution node which is provided as the transmission interface. In this case, the consecutive number would be required for the recipient to recognize whether all fragments of the telegram have been completely transmitted. For the first fragment, the consecutive number may be at the beginning or at the end of the first fragment. For the second fragment and/or further fragments, the consecutive number must be located at the beginning of the second fragment and/or further fragments.

According to another embodiment, the first fragmentation information includes a fragment number of the second fragment. In addition, the first fragmentation information may include the consecutive number and the value of the priority level of the telegram. The at least one distribution node identifies the first fragment of the interrupted telegram with the first priority level by a first fragmentation symbol at the end of the interrupted telegram. The recipient, i.e. the addressed subscriber for which the telegram is intended, may recognize from the fragment number whether all fragments of the telegram have been transmitted and the recipient has received all fragments. In addition, the recipient may obtain information about the fragment number of the second fragment. The recipient recognizes the fragmentation of the telegram by the first fragmentation symbol at the end of the interrupted telegram, provided that the recipient does not include a standard Ethernet controller (no standard network card) but is able to interpret and process the special fragmentation symbol.

The fragment number of the second fragment does not necessarily have to be sent by the at least one distribution node to indicate the fragmentation because the recipient is able to recognize the fragmentation of the telegram by the first fragmentation symbol at the end of the first fragment.

A further advantage of the embodiment is that the at least one distribution node does not have to observe a minimum length for the fragmented telegram when fragmenting the telegram with the first priority level, since a recipient that is not equipped with a standard Ethernet controller does not require a minimum length of 64 bytes for processing the first and second fragments of the telegram with the first priority level, as is required by default for an Ethernet telegram.

As an alternative to the above-mentioned fragment number of the second fragment, the first fragmentation information of the first fragment may also be realized in form of a reserved bit in a data field containing the first fragmentation information. The reserved bit may comprise two states by which it may be determined whether the first fragment is actually the first fragment of the telegram. For example, state one or state zero of the reserved bit may be used for this purpose.

In a further embodiment, the second fragment of the telegram with the first priority level is divided up into at least two sub-fragments, wherein a first sub-fragment of the telegram with the first priority level comprises a second fragmentation symbol and the second fragmentation information at the beginning of the first sub-fragment. The second fragmentation information may include a fragment number, which may have the value of the fragment number of the first fragment. In addition, the second fragmentation information may include the consecutive number as well as the value of the priority level of the telegram or, respectively, the fragment or sub-fragment. The first sub-fragment has the first fragmentation information at the end of the first sub-fragment, which may include the fragment number of a second sub-fragment. The first sub-fragment has the first fragment symbol at the end of the first sub-fragment. The advantage of this embodiment is that a further interruption of the telegram with the first priority level is also possible, as well. The recipient may recognize a first sub-fragment, which is not the last fragment of the interrupted telegram, by the second fragmentation symbol at the beginning of the first sub-fragment and by the first fragmentation symbol at the end of the first sub-fragment.

In addition, the recipient may assign a first sub-fragment via the second fragmentation information which may include the fragment number, which may have the value of the fragment number of the first fragment. Furthermore, the second fragmentation information may include the value of the priority level and the consecutive number. Also, the second sub-fragment may advantageously be recognized and assigned by the recipient by the fragment number which may be sent along at the end of the first sub-fragment in form of the first fragmentation information. The first fragmentation information may also include the consecutive number as well as the priority level. Moreover, the first and second fragmentation information allows the recipient to recognize whether a fragment or a sub-fragment of the interrupted telegram has been lost during transmission.

The fragment number is only needed for the second fragment or further fragments, respectively. The fragment number may thereby be located at the beginning and/or at the end of the second fragment or at the beginning and/or at the end of the further fragments, respectively. Furthermore, the fragment number may also be transferred for the first fragment from the at least one distribution node. The at least one distribution node may evaluate the fragment number, however, this is not mandatory, but the receiving subscriber must be capable of processing the fragment number of the individual fragments.

If the protocol used may be used to determine whether the recipient has received the telegram in its entirety by the nature of the telegram, then in this case the use of the fragment number may be dispensed with since this may be used to detect a missing fragment and it is not intended when transmitting fragments that the fragments may overtake one another.

According to a further embodiment, the second sub-fragment of the telegram having the first priority level has the second fragmentation symbol and the second fragmentation information at the beginning of the second sub-fragment. The second fragmentation information of the second sub-fragment may include the fragment number with the value of the fragment number of the first sub-fragment. Moreover, the second fragmentation information may include the value of the priority level and the consecutive number. The at least one distribution node may mark the second sub-fragment of the telegram with the first priority level with the value zero of the fragment number of the first fragmentation information at the end of the second sub-fragment. The recipient knows from the display of the fragment number with the value zero that no further fragment of the telegram with the first priority level follows. Furthermore, this allows the recipient to determine whether the recipient has received all fragments and/or all sub-fragments during transmission. Additionally, the recipient may recognize from the second fragmentation symbol at the beginning of the second sub-fragment and at the end of the first sub-fragment, which is formed without the first fragmentation symbol, that the second sub-fragment is the last fragment of the interrupted telegram.

As an alternative to displaying the fragment number with the value zero, the information that the second sub-fragment is the last sub-fragment of the telegram may be stored in the data field containing the first fragmentation information using the above mentioned reserved bit and its two states. The two states may be used to realize Boolean values in the form of zero and one for the last sub-fragment.

In a further embodiment, a possible fragmentation of the telegram having the first priority level is indicated by setting a Fragmentation TAG at the beginning of the telegram with the first priority level, the Fragmentation TAG comprising a type field for a used protocol within user data of the first fragment. The at least one distribution node interrupts the telegram with the first priority level such that the interrupted telegram forming the first fragment of the telegram has a minimum length during the interruption process. The fragmentation of the telegram with the first priority level is indicated at the end of the first fragment having the first fragmentation information, wherein the first fragmentation information may include the fragment number of the second fragment. In addition, the first fragmentation information may include the priority level of the telegram or, respectively, fragment and the consecutive number.

The at least one distribution node forwards the telegram further as soon as the transmission path between the distribution node and the recipient or the further distribution node is free. This means that the proposed method, automation network and distribution node, does not require a waiting period from the at least one distribution node until the at least one distribution node may proceed to the transmission of the telegram. Since the at least one distribution node does not know during transmission of the telegram that the at least one distribution node may possibly receive a higher prioritized telegram which is to be forwarded before the currently transmitted telegram, the at least one distribution node generates the Fragmentation TAG at the beginning of the telegram which indicates the possible fragmentation to the recipient during processing of the telegram. The distribution node interrupts the telegram in an advantageous way so that the first fragment has a minimum length which e.g. requires 64 bytes for the Ethernet telegram. This means that even a subscriber with a standard Ethernet controller may process the fragment. The actual fragmentation is indicated by the at least one distribution node by the first fragmentation information at the end of the first fragment.

According to another embodiment, the second fragment of the telegram having the first priority level is divided up into at least two sub-fragments. The first sub-fragment has a fragment target address at the beginning of the first sub-fragment, comprising a second fragmentation information, which may comprise a fragment number with the value of the fragment number of the first fragment. Furthermore, the second fragmentation information may comprise the value of the priority level and the consecutive number. A plurality of subscribers may be addressed via the fragment target address. Alternatively, the fragment target address may be defined in such a way that only a single subscriber or all subscribers of the automation communication network may be addressed. The first sub-fragment of the telegram may contain the first fragmentation information having the fragment number of a second sub-fragment at the end of the first sub-fragment. In addition, the first fragmentation information may have the value of the priority level of the first sub-fragment and the consecutive number.

The fragment target address allows for saving telegram bytes for the first sub-fragment of the second fragment as well as for the second sub-fragment for the respective telegram structure, since the fragment target address may also include the second fragmentation information with the fragment number, which may have the value of the fragment number of the first fragment of the telegram. Moreover, the second fragmentation information may include the value of the priority level and the consecutive number. This procedure allows the at least one distribution node to quickly forward the individual fragments and sub-fragments, because there is less overhead for the fragments and sub-fragments.

In a further embodiment, the fragment target address has a sender address, a target address, and the Fragment TAG at the beginning of the first sub-fragment. Furthermore, the fragment target address may comprise an additional data field, wherein the additional data field may have a VLAN TAG if the telegram includes the additional data field with the VLAN TAG. If the fragment target address is defined in the way shown, a standard switch may be used advantageously. This is because a standard switch requires the complete beginning (header) of the telegram up to a type field which specifies the used protocol of the telegram's user data.

According to a further embodiment, the second sub-fragment of the telegram having the first priority level, which may be a last sub-fragment of the telegram, may have filler bytes if the second sub-fragment is shorter than the minimum length. Insertion of filler bytes is indicated by setting the fragment number value of the first fragmentation information of the second sub-fragment to a PAD value at the end of the second sub-fragment. PAD may be a certain value of the fragment number. Alternatively, it is conceivable to reserve one bit in each fragment or sub-fragment in a data field containing the first fragmentation information at the end of the fragment or sub-fragment to display the PAD information. For example, this bit may assume a state of zero for all fragments or sub-fragments that are not the last fragment or, respectively, sub-fragment and a state of one for the last fragment or, respectively, sub-fragment that is shorter than the minimum length. The second sub-fragment has a filler byte data field at the end of the second sub-fragment which contains the filler byte count. The mechanism including the filling with filler bytes guarantees in a simple way that a subscriber comprising a standard Ethernet controller may be used and is able to process the telegrams.

In another embodiment, the telegram with the first priority level is embodied as an Ethernet telegram. The transmission and the structure of the telegram are advantageously based on the widely used Ethernet standard. This simplifies implementation since the subscriber does not have to be converted. In addition, it saves costs and time and improves the compatibility of the individual nodes in the network.

The advantageous embodiments and further embodiments of the invention described above and/or indicated in the sub-claims may be applied individually or in any combination with each other, except, for example, in cases of clear dependencies or incompatible alternatives.

FIG. 1 shows a schematic structure of an automation communication network 100 having a plurality of distribution nodes and network segments. The automation communication network 100 comprises a first distribution node SW1 and a second distribution node SW2 which may be connected via a field bus and may have a memory. The topology of the automation communication network 100 provides that a first network segment N1 with a first subscriber TN A may be connected via a first data transmission link D1 to a first input/output interface P0 of the first distribution node SW1. The first subscriber TN A may be a master subscriber, but this is not mandatory.

The first distribution node SW1 is connected to a first input/output interface P0 of a second distribution node SW2 via a second input/output interface P2 and a second data transfer path D2. A second input/output interface P2 of the second distribution node SW2 connects the second distribution node SW2 via a third data transmission link D3 to a second network segment N2 comprising a second node TN B. In addition to the shown second node TN B in the second network segment N2, the second network segment N2 may have further subscribers. The second subscriber TN B may e.g. be a slave subscriber if the management hierarchy of the automation communication network 100 is to be based on the master-slave principle.

A third input/output interface P1 of the first distribution node SW1 connects the first distribution node SW1 via a fourth data transmission link D4 to a third network segment N3, having a third subscriber TN C. In addition to the shown third subscriber TN C in the third network segment N3, the third network segment N3 may have further subscribers. For example, the third subscriber TN C may be a slave subscriber if the management hierarchy of the automation communication network 100 is to be based on the master-slave principle.

The second distribution node SW2 is connected to a fourth network segment N4, comprising a fourth subscriber TN D, via a fifth data transmission link D5 using a third input/output interface P1. Apart from to the shown fourth node TN D in the fourth network segment N4, the fourth network segment N4 may have further nodes. For example, the fourth node TN D may be a slave subscriber if the management hierarchy of the automation communication network 100 is to be based on the master-slave principle.

Alternatively, the first to fourth subscriber TN A-TN D or one of the first to fourth subscribers TN A-TN D may also be a subscriber embodied in a different manner. For example, a standard Ethernet subscriber comprising a standard Ethernet controller or an Ethernet subscriber comprising a non-standard Ethernet controller is conceivable. Data transmission in the automation communication network 100 shown in FIG. 1 may be based on a uniform real-time capable network protocol, for example the EtherCAT protocol.

The depiction of FIG. 1 of double arrows between the first to fourth subscribers TN A-TN D in the first to fourth network segment N1-N4 and the first and second distribution nodes SW1, SW2 indicates that bidirectional data transmission between the first to fourth subscribers TN A-TN D and the first and second distribution nodes SW1, SW2 is possible on a forward run and return path. The first to fifth data transmission links D1-D5 between the two distribution nodes SW1, SW2 and the four subscribers TN A-TN D also have a forward and return path.

Consequently, data may be transmitted between the individual subscribers TN A-TN D via a closed data transmission path in the automation communication network 100 by telegrams with assigned priority levels. Furthermore, the depiction of two distribution nodes SW1, SW2 is not to be regarded as mandatory since more or fewer distribution nodes may be equally arranged within the automation communication network 100. Also, the number of individual input/output interfaces of the distribution nodes may differ from the described number of input/output interfaces. Furthermore, it is conceivable to realize the automation communication network 100 with a larger or smaller number of network segments and/or nodes.

The following describes an exchange of data by telegrams with assigned priority levels between the first to fourth subscribers TN A-TN D. The first subscriber TN A may be a master subscriber and the second to fourth subscribers TN B-TN D may each be a slave subscriber. The first subscriber TN A puts a header at the top of each telegram in the automation communication network 100, which may be an EtherCAT telegram with assigned priority levels, in which the second subscriber TN B or further subscribers in the second network segment N2 and/or the third subscriber TN C or further subscribers in the third network segment N3 and/or the fourth subscriber TN D or further subscribers in the fourth network segment N4, which are to execute a write operation in which data are to be written into a user data field of the respective EtherCAT telegram. This header comprises information for the two distribution nodes SW1, SW2 arranged between the first to fourth subscribers TN A-TN D in the automation communication network 100 with respect to the forwarding of the EtherCAT telegrams, which are referred to as telegrams in the following. The telegrams are processed by the second to fourth node TN B-TN D during passage and are sent back to the first node TN A by the respective last node TN B-TN D in the automation communication network 100.

In the following, in the fourth network segment N4, the fourth subscriber TN D sends a first telegram B with a first priority level 200, which for example comprises an integer value two, via the fifth data transmission link D5 to the third input/output interface P1 of the second distribution node SW2. The second distribution node SW2 forwards the first telegram B with a first priority level 200 via the first input/output interface P0 of the second distribution node SW2 and the second data transfer link D2 to the second input/output interface P2 of the first distribution node SW1. The first distribution node SW1 forwards the first telegram B having the first priority level via the first input/output interface P0 and the first data transmission link D1 to the first subscriber TN A in the first network segment N1.

The second subscriber TN B in the second network segment N2 sends a second telegram C having a second priority level 210, which for example has an integer value three, via the third data transmission link D3 to the second input/output interface P2 of the second distribution node SW2. The second distribution node SW2 routes the second telegram C having a second priority level 210 via the first input/output interface P0 of the second distribution node SW2 and the second data link D2 to the second input/output interface P2 of the first distribution node SW1. The first distribution node SW1 routes the second telegram C having the second priority level 210 via the first input/output interface P0 of the first distribution node SW1 and the first data transmission link D1 to the first subscriber TN A in the first network segment.

The third node TN C in the third network segment N3, as well, sends a third telegram A1 and a fourth telegram A2 via the fourth data transmission link D4 to the third input/output interface P1 of the first distribution node SW1, wherein the third telegram A1 and the fourth telegram A2 include a third priority level 220. The third priority level 220 e.g. has the integer value one. The first distribution node SW1 forwards the third telegram A1 and the fourth telegram A2 via the first input/output interface P0 and the first data transmission link D1 to the first subscriber TN A in the first network segment N1.

The first to fourth telegrams B, C, A1, A2 each comprise a header with information for the first distribution node SW1 and/or for the second distribution node SW2 with regard to the forwarding procedure of the first to fourth telegrams B, C, A1, A2, the header being generated by the first subscriber TN A. If the telegrams are not embodied as EtherCAT telegrams, it is also conceivable that the second to fourth subscriber TN B-TN D, which sends the first to fourth telegram B, C, A1, A2, generates the header of the telegram.

The values of the individual first to third priority levels 200, 210, 220 of the first to fourth telegrams B, C, A1, A2 have been chosen exemplarily. Similarly, the first to fourth telegrams B, C, A1, A2 may have different priority levels. Alternatively the first and the second distribution node SW1, SW2 may be embodied to set the values of the priority levels of the telegrams.

Figure 2:
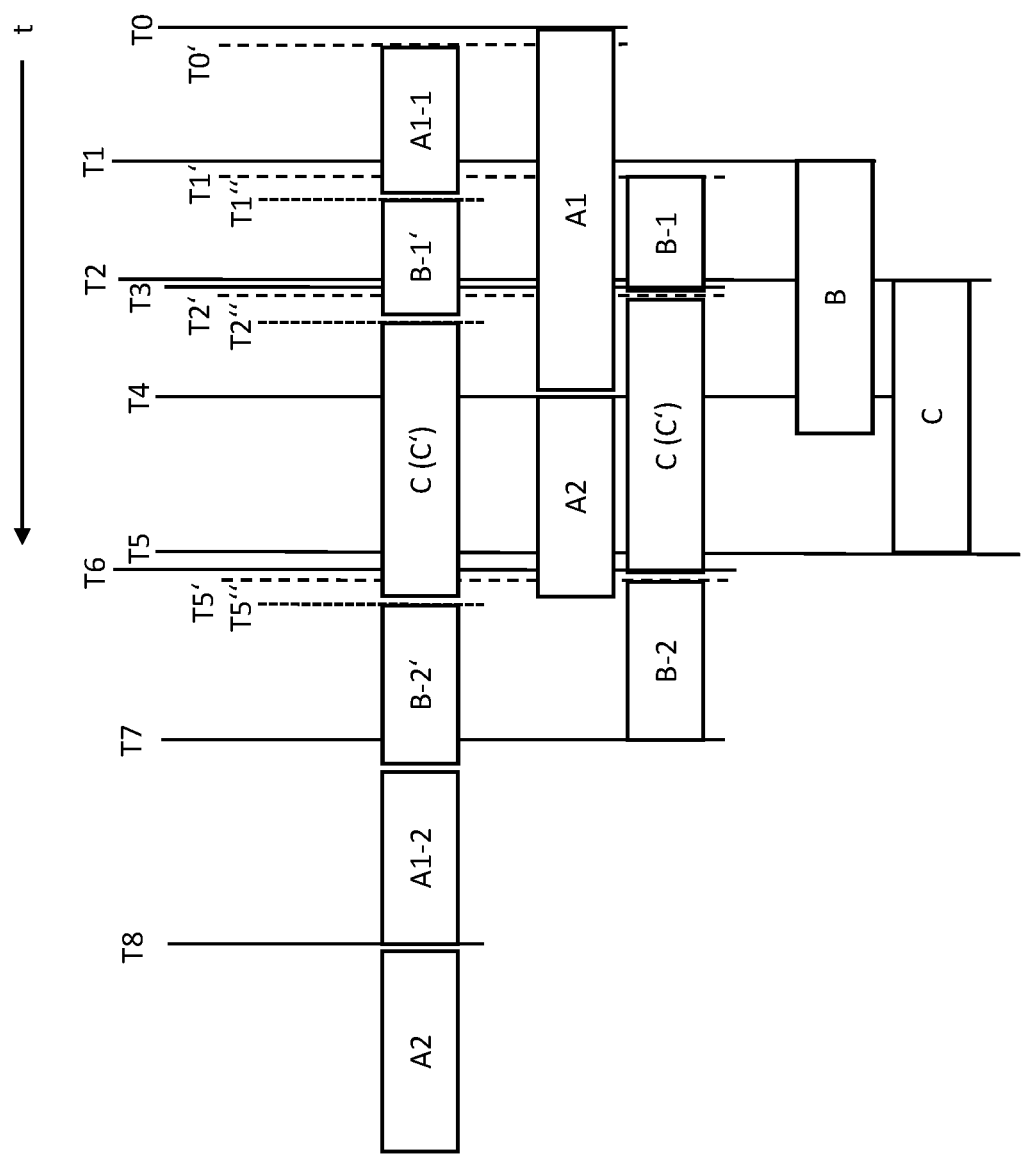
FIG. 2 shows a schematic flow chart of a data transmission in the form of telegrams between subscribers of the network segments.

FIG. 2 shows a schematic time line for data transmission by telegrams between the first to fourth subscribers TN A-TN D of the first to fourth network segment N1-N4 shown in FIG. 1. Furthermore, FIGS. 3 to 8 show schematic telegram structures of the subscribers TN A-TN D shown in FIG. 1 and FIG. 2 and the first to fourth telegrams B, C, A1, A2 transmitted between them. A time line tin FIG. 2 has been selected in such a way that a point in time T0 occurs prior to a point in time T8 in the automation communication network 100. The description of the following figures, however, is not chronological, but at first a first telegram traffic at the second distribution node SW2 is explained and then a second telegram traffic at the first distribution node SW1 is described, wherein the transmission of the first telegram B having the first priority level 200 with the value two is performed by the fourth node TN D, and the transmission of the second telegram C having the second priority level 210 with the value three from the second subscriber TN B, and the transmission of the third telegram A1 having the third priority level 220 with the value one from the third subscriber TN C, and the transmission of the fourth telegram A2 having the third priority level 220 with the value one from the third subscriber TN C may be carried out analogously to the above description. In order to simplify the description, the first input/output interface P0 of the first and second distribution nodes SW1, SW2 is in the following considered in more detail than their second input/output interface P2 and third input/output interface P1.

At a point in time T1, the second distribution node SW2 receives the first telegram B having the first priority level 200 with the value two on the third input/output interface P1 of the second distribution node SW2. The second distribution node SW2 forwards the first telegram B having the first priority level 200 with the value two on the first input/output interface P0 of the second distribution node SW2 to the first distribution node SW1. The first distribution node SW1 receives the first telegram B at a time T1'.

Figure 3:
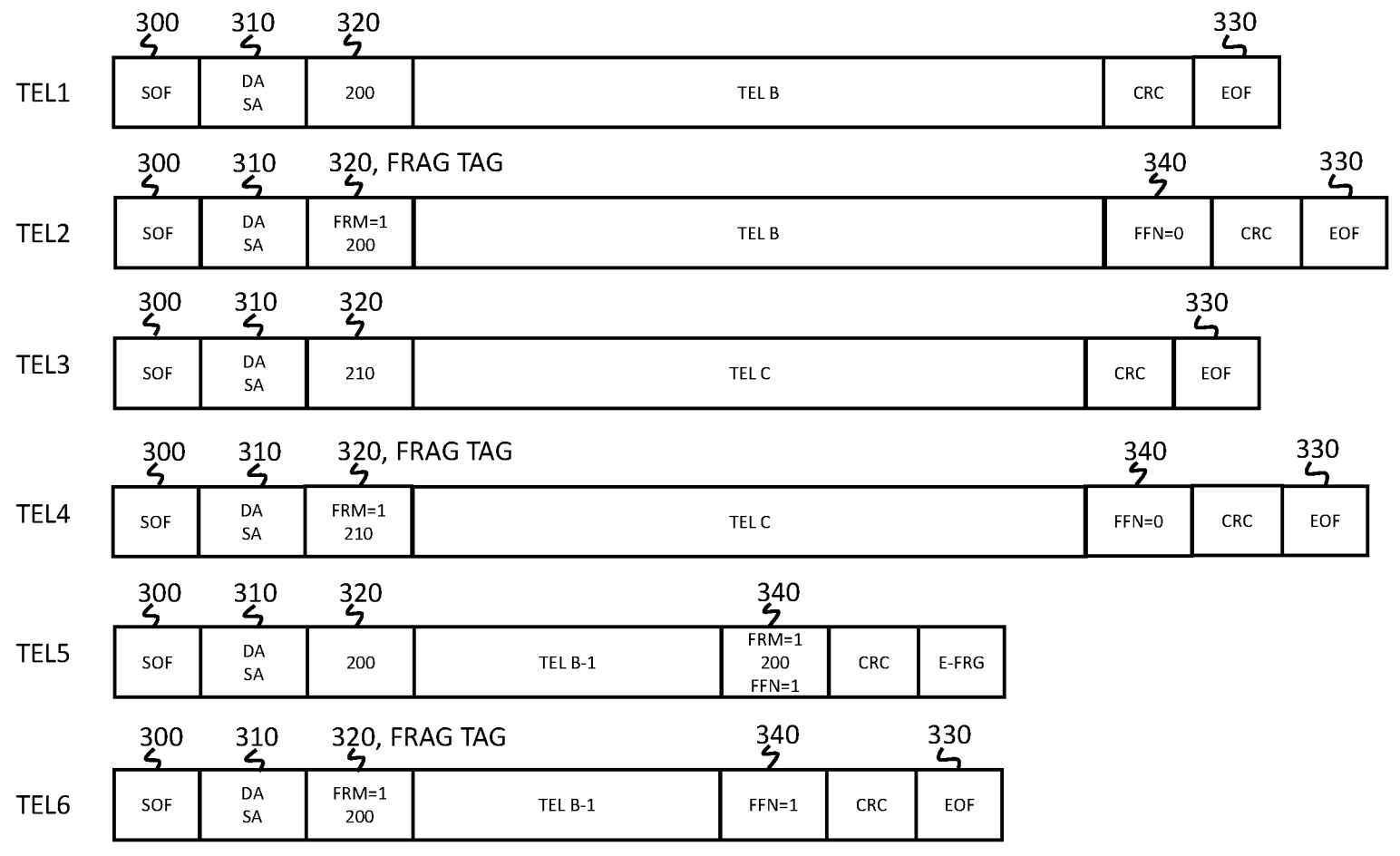

The first telegram B having the first priority level 200 and the value two forwarded by the second distribution node SW2 may have a first telegram structure TEL1 as shown in FIG. 3 when sending the telegram on the first input/output interface P0 of the second distribution node SW2. The first telegram B comprises a first data field 300, wherein the first data field 300 has a Start of Frame (SOF), i.e. a bit sequence comprising eight bytes which indicates the start of the first telegram B to the subscriber for which the telegram is intended. The SOF comprises a so-called "preamble", i.e. an alternating seven-byte bit sequence and a so-called "Start of Frame Delimiter" (SFD), an alternating one-byte bit sequence ending with the dual number 1.

Furthermore, the first telegram B with the first telegram structure TEL1 comprises a second data field 310. The second data field comprises a target address DA and a sender address SA, wherein the target address DA may be embodied as a MAC address (Media Access Control) as a so-called "Unicast address" (addressing a subscriber in the automation communication network 100) or, respectively, as a so-called "Multicast address" (addressing a plurality of subscribers in the automation communication network 100) and as a so-called "Broadcast address" (addressing all subscribers in the automation communication network 100). The sender address SA indicates the subscriber that has sent the respective telegram, i.e. in the present case the sender address SA corresponds to the MAC address of the fourth subscriber TN D. The second data field contains 6 bytes each for the target address DA of the telegram and 6 bytes for the sender address SA of the telegram.

A third data field 320 of the first telegram B with the first telegram structure TEL1 comprises a first priority level 200 assigned to the first telegram B, which has the integer value two. The priority level 200 of the first telegram B may have been defined by the sending fourth subscriber TN D in the fourth network segment N4. For this purpose, the fourth subscriber TN D may, in case the first telegram B is extended by an additional data field VLAN TAG comprising four bytes and having a type field ET in the first two bytes, a VLAN priority level, a VLAN identification and a reserve in the second two bytes, use the VLAN priority level as the first priority level 200 assigned to the first telegram B. This procedure is e.g. used in the TSN (Time Sensitive Networking) procedure. Furthermore, the first priority level 200 assigned to the first telegram B may also be a priority level hidden in the MAC addresses or, respectively, the assignment of the first priority level 200 may also be carried out by using a new type field ET.

The second and third data fields 310, 320 of the first telegram B with the first telegram structure TEL1 may form the header of the telegram. The header of the first telegram B is followed by a user data section TEL B of the first telegram B and a 4-byte checksum field CRC which comprises a checksum calculated via the header and the user data section TEL B of the first telegram B with the first telegram structure TEL1. The first data field 300 is not included in the calculation of the checksum. The purpose of the checksum calculation is to be able to detect a possible faulty data transmission by the first subscriber TN A in the first network segment N1 independently performing a checksum calculation of the received first telegram B and, in case of a mismatch, may conclude that the data transmission is faulty. An end of the first telegram B with the first telegram structure TEL1 is recognized by the first subscriber TN A in the first network segment N1 after the checksum field CRC through a fourth data field 330 containing an end symbol EOF.

The bytes of the first telegram B transmitted with the Ethernet or the Ethernet-based real-time-capable EtherCAT protocol are coded as symbols, wherein e.g. in the case of Gigabit Ethernet a symbol set of 625 symbols is available for coding. Thus, a telegram based on the Ethernet standard has a start symbol (referred to as SOF above) as well as a sequence of further symbols for the data block of the first telegram B, comprising the second and third data fields 310, 320, the user data section TEL B of the first telegram B and the checksum field CRC, and finally the end symbol EOF. The start and the end symbol SOF, EOF are generated by a so-called "PHY" (actually from Physical Layer, the name for the bit transmission layer in the Open System Interconnection (OSI) model) when a signal referred to as "TX enable" is set to active by the sending subscriber via the starting transmission process of the first telegram B, including an Ethernet controller. The term PHY refers to a physical interface (or integrated circuit) that is used to implement the physics of data transmission, i.e. it is responsible for encoding and decoding data over different voltage levels.

The first to fourth subscribers TN A-TN D each have an Ethernet controller, which may be embodied as an additional integrated circuit. This Ethernet controller generates the above-mentioned preamble and the Start of Frame Delimiter (SFD) for a telegram to be sent and calculates the checksum and inserts it into the checksum field CRC. The header of the telegram comprising the sender address SA as well as the target address DA and the type field ET and the respective user data section are specified by the respective first to fourth subscriber TN A-TN D. When receiving the telegram, the corresponding distribution node compares the target address DA of the telegram with its own MAC address (Media Access Control), as well as with the multicast address and with the broadcast address mentioned above, wherein the corresponding distribution node forwards the telegram if the addresses match. Alternatively, the distribution node may decide whether the distribution node forwards the telegram based on the VLAN identification of the additional data field VLAN TAG, or an identification within a fragmentation TAG FRAG TAG, e.g., for the first telegram structure TEL1 in FIG. 3.

In the case that the Ethernet controller of the first subscriber TN A in the first network segment N1, for which the first telegram B is intended, is a standard Ethernet controller for which the first telegram must have a required minimum length of 64 bytes for processing, the first telegram B with the first priority level 200 may also have the second telegram structure TEL2 shown in FIG. 3. To simplify the description of the individual telegram structures in the figures, the differences in the individual telegram structures are described below. Identical sections in the individual telegram structures are not described again.

In contrast to the first telegram structure TEL1, the second telegram structure TEL2 provides for a fragmentation TAG FRAG TAG for the first telegram B for the third data field 320. The fragmentation TAG has the integer value two of the first priority level 200 as well as a consecutive number FRM, which may be an integer and may be newly generated at each first input/output interface P0 of the first and second distribution nodes SW1, SW2, on which the first telegram B is forwarded. The consecutive number FRM is thus link-local, i.e. the consecutive number FRM is only unique on one data transmission path between a subscriber and a distribution node or, respectively, between the first and second distribution nodes SW1, SW2. In the present case, the consecutive number FRM for the second telegram structure TEL2 of the first telegram B has the value one. For a first fragment, the consecutive number FRM may be located at the beginning or at the end of the first fragment. For a second fragment and/or further sub-fragments, the consecutive number must be located at the beginning of the second fragment and/or further sub-fragments.

In combination with the priority level assigned to the respective telegram, the consecutive number allows an unambiguous identification of the corresponding telegram or its fragments. The receiving subscriber may also recognize by the consecutive number FRM and a fragment number FRG for the second fragment or further sub-fragments whether the fragments or sub-fragments have been completely transmitted.

In addition, the Fragmentation TAG FRAG TAG may also have a type field ET. The first distribution node SW1, which is connected upstream of the receiving first node TN A of the first telegram B, is notified by the second distribution node SW2 of a possible fragmentation of the first telegram B by the fragmentation TAG FRAG TAG. This is because during the forwarding process of the first telegram B from the second distribution node SW2, the second distribution node SW2 does not need to have entirely received the first telegram B before it forwards it to the first distribution node SW1 without waiting time. Thus, when the forwarding process of the first telegram B, the second distribution node SW2 does not know whether the second distribution node SW2 will receive the higher prioritized second telegram C from the second subscriber TN B and must interrupt the transmission of the first telegram B.

A first fragmentation information 340 at the end of the first telegram B indicates an actual fragmentation of the first telegram B to the first distribution node SW1. The first fragmentation information may have the fragment number FFN of a second fragment. By a value zero of the fragment number FFN before the checksum field CRC of the first telegram B having the first priority level 200, the second distribution node SW2 indicates to the first distribution node SW1 that the second distribution node SW2 has not fragmented the first telegram B.

At a time T2 in FIG. 2, the second distribution node SW2 receives the second telegram C from the second subscriber TN B of the second network segment N2 on the second input/output interface P2 of the second distribution node SW2. The second telegram C comprises the second priority level 210 comprising the integer value three. Thus, the second telegram C has a higher priority than the first telegram B. Consequently, the second distribution node SW2 interrupts the transmission of the first telegram B on the first input/output interface P0 and fragments the first telegram B. The interruption of the transmission of the first telegram B does not necessarily have to be instantaneous; rather, the second distribution node SW2 waits until 59 bytes of the first telegram B have been transmitted until the second distribution node SW2 interrupts the transmission of the first telegram B. The second distribution node SW2 then sends the second telegram C with the second priority level 210 on the first input/output interface P0. A time T2' in FIG. 2 indicates the receipt of the second telegram C from the first distribution node SW1 and a time T2" may correspond to the time at which the first subscriber TN A receives the second telegram C.

FIG. 3 shows a third telegram structure TEL3 and a fourth telegram structure TEL4 for the second telegram C with the second priority level 210 as well as a fifth telegram structure TEL5 and a sixth telegram structure TEL6 of a first fragment B-1 of the first telegram B. The second distribution node SW2 completes the interrupted first telegram B, which forms the first fragment B-1 of the first telegram B, in a defined manner by the second distribution node SW2 sending the first fragmentation information 340 at the end of the first fragment B-1. The first fragmentation information 340 may be seen in the fifth telegram structure TEL5 between the user data section TEL B-1 of the first fragment B-1 and the checksum field CRC. The first fragmentation information 340 has the fragment number FFN of the second fragment B-2 of the first telegram B which comprises the value 1. In addition, the first fragmentation information 340 for the fifth telegram structure TEL5 of the first fragment B-1 of the first telegram B comprises the value of the first priority level 200 and the consecutive number FRM with the value one. The second distribution node SW2 also indicates the end of the first fragment B-1 of the first telegram B by a first fragmentation symbol E-FRG which may be one of the symbols beyond the 256 symbols described above and may only be interpreted by a subscriber in the automation communication network 100 which includes a non-standard Ethernet controller.

If a standard Ethernet controller is used, the telegram structure of the first fragment B-1 of the first telegram B may correspond to the sixth telegram structure TEL6 in FIG. 3. The first fragment B-1 has the fragmentation TAG FRAG TAG in the third data field 320. The fragmentation TAG FRAG TAG has the consecutive number FRM of the first fragment B-1 with the value one, and the first priority level 200 of the first fragment B-1 with the value two. The first fragmentation information 340 between the user data section TEL B-1 of the first fragment B-1 and the checksum field CRC of the first fragment B-1 has the fragment number FFN of the second fragment B-2, where the fragment number FFN of the second fragment B-2 has the value one.

The checksum in the checksum field CRC of the fifth and sixth telegram structure TEL5, TEL6, respectively, comprises the checksum calculated via the second data field 310, the third data field 320, the user data section TEL B-1 of the first fragment B-1 and the first fragmentation information 340. The first distribution node SW1 may then independently calculate said checksums of the fifth and sixth telegram structures TEL5, TEL6 on receipt of the first fragment B-1 and compare them with the checksums of the fifth and sixth telegram structures TEL5, TEL6 sent along with the first fragment B-1 from the second distribution node SW2. If the two checksums do not match, the first distribution node SW1 may discard the first fragment B-1.

In an automation communication network according to the state of the art in which the second distribution node SW2 is not capable interrupting the transmission of the first telegram B having the first priority level 200 on the first input/output interface P0 of the second distribution node SW2, if the second distribution node SW2 has received a second telegram C with the higher value second priority level 210 on the second input/output interface P2, the second telegram C having the higher prioritized second priority level 210 may not be forwarded until the second distribution node SW2 has completely transmitted the first telegram B with the first priority level 200. This represents a considerable restriction of the telegram traffic or of data transmission in an automation communication network embodied in this way, in which it cannot be guaranteed that the first and second telegram B, C arrive in time at the subscriber for which the first and second telegram B, C are intended.

In the automation communication network 100 the second telegram C has a third telegram structure TEL3 or a fourth telegram structure TEL4 as shown in FIG. 3 during forwarding from the second distribution node SW2. The third telegram structure TEL3 of the second telegram C is analogous to the first telegram structure TEL1 of the first telegram B, wherein the second telegram C in the third data field 320 has the second priority level 210 with the value three, whereas the first telegram B in the third data field 320 comprises the first priority level 200 with the value two. This is because the third telegram structure TEL3, like the first telegram structure TEL1, is in each case the telegram structure of a nonfragmented first and second telegram B, C, which a subscriber with a non-standard Ethernet controller may process.

The fourth telegram structure TEL4 of the second telegram C is further analogous to the second telegram structure TEL2 of the first telegram B, the second telegram C in the fragmentation TAG FRAG TAG having the second priority level 210 with the value three, whereas the first telegram B in the fragmentation TAG FRAG TAG comprises the first priority level 200 with the value two. This is because the fourth telegram structure TEL4, like the second telegram structure TEL2, is the telegram structure of a non-fragmented first and second telegram B, C, which a subscriber with a non-standard Ethernet controller may process.

Figure 4:
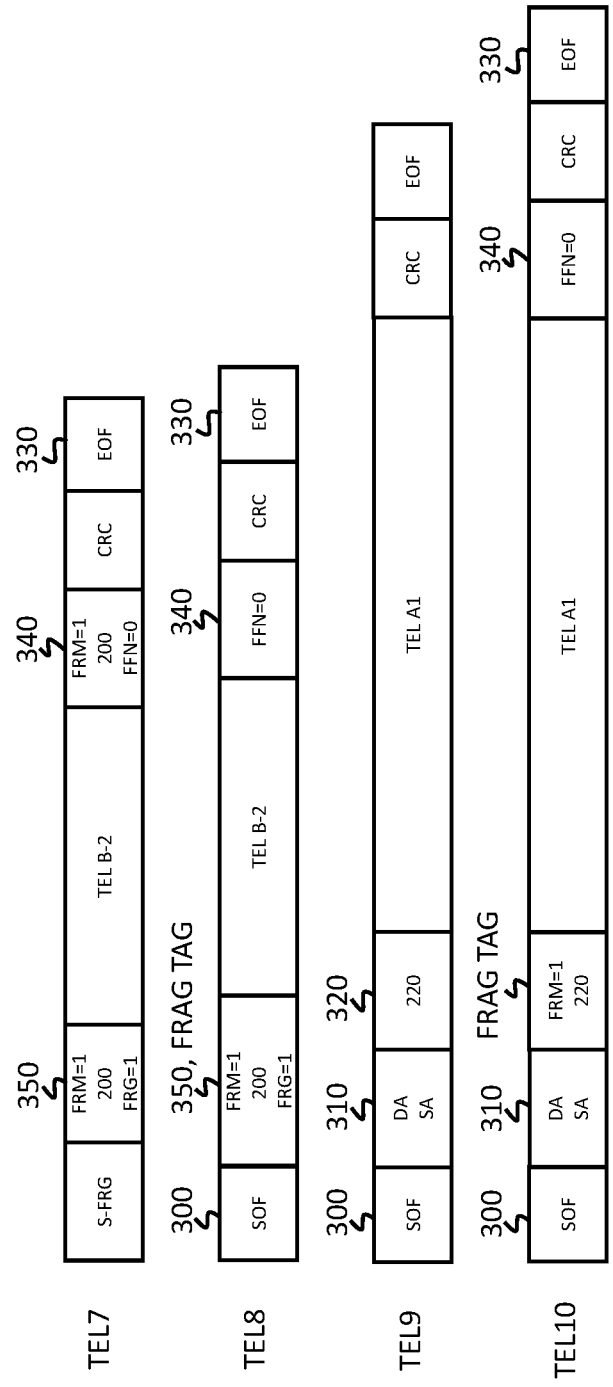
FIG. 4 shows a seventh and eighth telegram structure of the first fragmented telegram which forms the second fragment of the first telegram, and a ninth and tenth telegram structure of a third unfragmented telegram.

At a point in time T5 in FIG. 2, the second distribution node SW2 has completely forwarded the second telegram C. The second distribution node SW2 subsequently forwards the remaining part of the first telegram B, which forms the second fragment B-2 of the first telegram B, to the first distribution node SW1. Alternatively, it is conceivable that the second distribution node SW2 does not forward the second fragment B-2 of the first telegram B to the first fragment B-1 immediately subsequent to the interruption of the first telegram B. The second fragment B-2 of the first telegram B may moreover contain further sub-fragments. The first distribution node SW1 receives the second fragment B-2 of the first telegram B at a point in time T5' on the second input/output interface P2 of the first distribution node SW1. A point in time T5" may be the time when the first subscriber TN A receives the second fragment B-2. The second fragment B-2 of the first telegram B with the first priority level 200 may have a seventh telegram structure TEL7 or an eighth telegram structure TEL8 as shown in FIG. 4 when the second fragment B-2 is transmitted on the first input/output interface P0 from the second distribution node SW2.

The second fragment B-2 of the first telegram B has the seventh telegram structure TEL7 if the receiving subscriber of the first telegram B includes a non-standard Ethernet controller. This is because the seventh telegram structure TEL7 of the second fragment B-2 comprises a second fragmentation symbol S-FRG at the beginning of the second fragment B-2, which, in addition to the above-mentioned first fragmentation symbol E-FRG, may only be processed by a non-standard Ethernet controller. The second fragmentation symbol S-FRG is followed by a second fragmentation information 350 of the second fragment B-2 of the first telegram B. The second fragmentation information 350 may comprise a fragment number FRG, wherein the fragment number FRG may have the value of the fragment number FFN of the first fragment B-1 of the first telegram B. This means that the fragment number FRG of the second fragment B-2 with the seventh telegram structure TEL7 may thus have the value one.

Furthermore, the second fragmentation information 350 for the seventh telegram structure TEL7 may include the first priority level 200 with the value two for the second fragment B-2 of the first telegram B, and the consecutive number FRM with the value one. In the seventh telegram structure TEL7, the second fragmentation information 350 is followed by the user data section TEL B-2 of the second fragment B-2. The first fragmentation information 340 for the second fragment B-2 of the first telegram B is located between the user data section TEL B-2 and the checksum field CRC in the seventh telegram structure TEL7. The first fragmentation information 340 may indicate the consecutive number FRM of the second fragment B-2 with the value one, as well as the value two of the first priority level 200 to the first distribution node SW1. The second distribution node SW2 may indicate that the second fragment B-2 is not followed by another fragment of the first telegram B by the fragment number FFN, which in this case is set to the value zero by the second distribution node SW2. The seventh telegram structure TEL7 for the second fragment B-2 concludes with the fourth data field 330 including the end symbol EOF. Thus, a second fragment does not necessarily have to end with the first fragment symbol E-FRG, but it is sufficient if the second fragment has the end symbol EOF. The fragment number FFN does not necessarily have to be incremented consecutively up to the last fragment. If, for example, the corresponding telegram is divided up into one hundred fragments, the fragment number FFN does not have to be incremented from one to one hundred for the individual fragments, but may also be done in such a way that the corresponding distribution node numbers the fragments from one to seven and then starts at the value one again for further fragments if the receiving subscriber knows the systematics in the serial numbering of the fragments. The advantage of numbering the fragments from one to seven is that telegram bytes may be saved.

The second fragment B-2 of the first telegram B has the eighth telegram structure TEL8 if the receiving subscriber of the first telegram B includes a standard Ethernet controller which requires a minimum length of the second fragment B-2 (and of the first fragment B-1) for processing the second fragment B-2 (and of the first fragment B-1) and is not able to interpret the second fragment symbol S-FRG (as well as the first fragment symbol E-FRG). The eighth telegram structure TEL8 comprises the first data field 300 with the SOF described above. The first data field 300 is followed in the eighth telegram structure TEL8 by the fragmentation TAG FRAG TAG, which may comprise the value two of the first priority level 200 of the second fragment B-2 as well as the second fragmentation information 350 with the fragment number FRG with the value one. Furthermore, the fragmentation TAG FRAG TAG or the second fragmentation information 350 may comprise the consecutive number FRM with the value one. A user data section TEL B-2 of the second fragment B-2 follows the fragmentation TAG in the eighth telegram structure TEL8. Between the user data section TEL B-2 of the second fragment B-2 and the checksum field CRC, the first fragmentation information 340 is arranged, which may have the fragment number FFN. In analogy to the seventh telegram structure TEL7, the second distribution node SW2 having the value zero of fragment number FFN may indicate that the second fragment B-2 of the first telegram B is not followed by any further fragments. The eighth telegram structure TEL8, too, ends analogously to the seventh telegram structure TEL7 with the fourth data field 330 comprising the end symbol EOF. The eighth telegram structure TEL8 does not have to end with the first fragmentation symbol E-FRG either, since the eighth telegram structure TEL8 has the fragmentation TAG FRAG TAG and therefore does not require the first fragmentation symbol E-FRG.

The above mentioned fragmentation TAG FRAG TAG of the second fragment B-2 may have a fragment target address FA, e.g., in the eighth telegram structure TEL8. The fragment target address FA may be embodied as a multicast address, for addressing a plurality of subscribers in the automation communication network 100, as a unicast address, for addressing a single subscriber or as a broadcast address, for addressing all subscribers in the automation communication network 100. With the fragment target address, it is possible to save telegram bytes for the second fragment B-2 of the first telegram B, as well as for other second fragments of the other telegrams for the respective telegram structure, since the fragment target address may furthermore include the second fragmentation information 350 comprising the fragment number FRG, which may comprise the value of the fragment number FFN of the first fragment B-1 of the first telegram B. This procedure allows the first or second distribution nodes SW1, SW2 to quickly retransmit the fragments, since there is less overhead for the fragments.

Furthermore, the fragment target address FA may also be defined in such a way that it has the sender address SA and the target address DA of the second fragment B-2 in addition to the fragmentation TAG FRAG TAG and the features mentioned above. As the case may be, the fragment target address FA may also include an additional data field VLAN TAG if the telegram has the additional data field VLAN TAG. Such a definition of the fragment target address FA advantageously allows to use a distribution node in the automation communication network 100, which may be embodied as a standard switch and consequently needs the complete header of the telegram or fragment up to the type field ET which indicates the used protocol of the user data of the telegram, e.g., in the eighth telegram structure TEL8.

In case that the second fragment B-2 of the first telegram B falls below the minimum length of 64 bytes, i.e. has less than 59 bytes with the first fragmentation information 340 and the checksum field, which comprise 5 bytes of the eighth telegram structure TEL8, the eighth telegram structure TEL8 comprises filler bytes as well as an additional filler byte data field PAD-LEN, which indicates the number of filler bytes before the first fragmentation information 340 in the eighth telegram structure TEL8.

Insertion of filler bytes is indicated by setting the value of the fragment number FFN of the first fragmentation information 340 of the second fragment B-2 to a value PAD. This is also not visible in telegram structure TEL8 in FIG. 4, either. PAD may be a certain value of the fragment number FFN. Alternatively, it is conceivable to reserve one bit in each fragment or sub-fragment in a data field comprising the first fragmentation information 340 at the end of the fragment or sub-fragment for displaying the information PAD. For example, this bit may assume a state of zero for all fragments or sub-fragments that are not the last fragment or sub-fragment and a state of one for the last fragment or sub-fragment that is shorter than the minimum length. In particular, a subscriber comprising a standard Ethernet controller may process telegrams or fragments which are brought to the minimum length of 64 bytes required by the Ethernet standard by inserting filler bytes.

In the following the second telegram traffic at the first distribution node SW1 is described. At a point in time TO in FIG. 2, the first distribution node SW1 receives the third telegram A1 with the third priority level 220, which was sent by the third subscriber TN C in the third network segment N3 via the fourth data transmission link D4 to the first distribution node SW1, on the third input/output interface P1 of the first distribution node SW1. The first distribution node SW1 sends the third telegram A1 to the first subscriber TN A in the first network segment N1 on the first input/output interface P0 of the first distribution node SW1, wherein the first subscriber TN A receives the third telegram A1 at a point in time TO' in FIG. 2. The third telegram A1 has the ninth telegram structure TEL9 or the tenth telegram structure TEL10 when sent from the first distribution node SW1. In analogy to the above description, the third telegram A1 comprises the ninth telegram structure TEL9 if the first subscriber TN A is embodied with a non-standard Ethernet controller and the tenth telegram structure TEL10 if the first subscriber TN A is embodied with a standard Ethernet controller.

The ninth telegram structure TEL9 for the third telegram A1 in FIG. 4 is structured analogously to the first and third telegram structures TEL1, TEL3 for the first and second telegrams B, C, wherein the ninth telegram structure TEL9 for the third data field 320 provides the value one of the third priority level 220. This is followed by the user data section TEL A1 of the third telegram A1, the checksum field CRC and the fourth data field 330 with the end symbol EOF. Thus, in case of the ninth telegram structure TEL9, the third telegram A1 has not been fragmented.

The first and the second distribution node SW1, SW2 each comprises a fragmentation table in which the first and the second distribution node SW1, SW2 may enter the not yet transmitted part of a fragmented telegram, which forms the second fragment of the respective telegram, which may be split into further sub-fragments, into the fragmentation table together with the second fragmentation information 350 of the second fragment. Furthermore, the respective distribution node SW1, SW2 notes the input/output interface on which the distribution node received the telegram and/or fragment as well as the further input/output interface of the distribution node SW1, SW2 to which the distribution node SW1, SW2 forwards the telegram and/or fragment. The fragmentation table may also contain the consecutive number FRM (both for the data transmission link when receiving the telegram and for the data transmission link when transmitting the telegram) as well as the priority level of the corresponding telegram or fragment. Since the third telegram A1 with the ninth telegram structure TEL9 was not interrupted by the first distribution node SW1 during transmission, the fragmentation table of the first distribution node SW1 does not yet contain any content. In the following, the content of the fragmentation table is only explained with regard to the first distribution node SW1. Likewise, the second distribution node SW2 may have a fragmentation table, as well.

The tenth telegram structure TEL10 of FIG. 4 for the third telegram A1 is analogous to the second and fourth telegram structures TEL2, TEL4 of FIG. 3 for the first and second telegrams B, C, wherein the fragmentation TAG FRAG TAG of the tenth telegram structure TEL10 has the value one of the third priority level 220 of the third telegram A1. The tenth telegram structure TEL10 may also provide the value one for the consecutive number FRM for the transmission of the third telegram A1 between the first distribution node SW1 and the first subscriber TN A in the first network segment N1. The first fragmentation information 340 may use the value of fragment number FFN equaling to zero to indicate that the first distribution node SW1 has not fragmented the third telegram A1. A first fragmentation table TAB1 of the first distribution node SW1 e.g. contains the following:

TABLE 1

| | A1 |
| --- | --- |
| Input/output interface (receipt) | P1 |
| FRM (receipt) | y |
| Input/output interface (transmit) | P0 |
| FRM (transmit) | 1 |
| Priority level | 220 |
| FFN | 0 |
| Telegram/fragment stored | FALSE |

However, it is also possible to store other information in the first distribution node SW1 than those in the first fragmentation table TAB1. The information may also be stored at another point in time.

Storing of the third telegram A1 is indicated in the fragmentation table e.g. by a Boolean variable with a first and second state FALSE, TRUE. In the present case, the first distribution node SW1 did not buffer the third telegram A1 in the fragmentation table, which is indicated by the first FALSE state of the Boolean variable because the first distribution node SW1 did not fragment the third telegram A1. The consecutive number FRM may initially have a default value y for the fourth data link D4 on which the first distribution node SW1 received the third telegram A1 (FRM (receipt)). The first distribution node SW1 may change this value. For the first data transmission link D1 on which the first distribution node SW1 sends the third telegram A1 the first distribution node SW1 sets the consecutive number FRM (FRM (transmit)) of the third telegram A1 e.g. to the value one. However, this could also have been done in a different way.

At a point in time T1' of FIG. 2, the first distribution node SW1 receives the first fragment B-1 of the first telegram B on the second input/output interface P2 of the first distribution node SW1. Since the first fragment B-1 having the first priority level 200 with the value two, has higher priority than the third telegram A1 with the third priority level 220 with the value one currently in the transmission process of the first distribution node SW1, the first distribution node SW1 interrupts the transmission of the third telegram A1, which forms a first fragment A1-1 of the third telegram A1 and completes the third telegram A1 in a defined manner, which is shown in an eleventh telegram structure TEL11 and twelfth telegram structure TEL12 for the first fragment A1-1 of the third telegram A1 in FIG. 5. The eleventh telegram structure TEL11 is structured analogously to the fifth telegram structure TEL5 in FIG. 3, thus the eleventh telegram structure TEL11 presupposes the same requirements for the first subscriber TN A as described above in the context for the fifth telegram structure TEL5.

To complete the first fragment A1-1 of the third telegram A1 in a defined manner, the first distribution node SW1 sends the consecutive number FRM with the value one currently corresponding to the third priority level 220, enters the value one of the third priority level 220 and sends the first fragmentation information 340, which may include the fragment number FFN with the value one of a second fragment A1-2, which has not yet been sent by the first distribution node SW1. As explained above, the first distribution node SW1 may generate the second fragmentation information 350 for the second fragment A1-2 of the third telegram A1, which may include the fragment number FRG with the value of the fragment number FFN of the second fragment A1-2, and buffers the second fragmentation information 350 in the fragmentation table e.g. together with the second fragment A1-2 of the third frame A1.

A second fragmentation table TAB2 of the first distribution node SW1 e.g. includes:

TABLE 2

| | A1 |
| --- | --- |
| Input/output interface (receipt) | P1 |
| FRM (receipt) | 0 |
| Input/output interface (transmit) | P0 |
| FRM (transmit) | 1 |
| Priority level | 220 |
| FFN | 1 |
| Telegram/fragment stored | TRUE |

The second fragmentation table may have the Boolean variable for buffering the second fragment A1-2 of the third telegram A1, wherein the Boolean variable with the second state TRUE indicates the buffering of the second fragment A1-2. The first distribution node SW1 may set the default value y of the consecutive number FRM (receipt) in the first fragmentation table TAB1 to zero for receiving the third telegram A1 in the second fragmentation table TAB2 since the third telegram A1 does not yet have first fragmentation information 340 when received from the first distribution node SW1.

Figure 5:
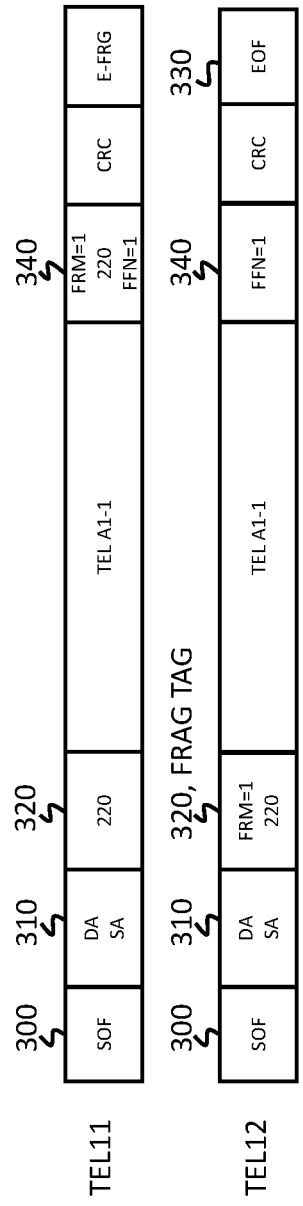
FIG. 5 depicts an eleventh and twelfth telegram structure of the third fragmented telegram, which forms the first fragment of the third telegram.

The twelfth telegram structure TEL12 in FIG. 5 is embodied in analogy to the sixth telegram structure TEL E in FIG. 3. Accordingly, the above described features are not repeated for the receiving subscriber, although they are equally valid for the twelfth telegram structure TEL12. For the twelfth telegram structure, the fragmentation TAG FRAG TAG is provided for the third data field 320. Moreover, the third data field 320 comprises the consecutive number FRM with the value one and the third priority level 220 with the value one. A user data section TEL A1-1 is followed by the first fragmentation information 340 which may contain the value one of the fragment number FFN of the second fragment A1-2 of the third telegram A1. A third fragmentation table TAB3 e.g. has the following contents:

TABLE 3

|  | A1 |
| --- | --- |
| Input/output interface (receipt) | P1 |
| FRM (receipt) | y |
| Input/output interface (transmit) | P0 |
| FRM (transmit) | 1 |
| Priority level | 220 |
| FFN | 1 |
| Telegram/Fragment stored | TRUE |

Compared to the first fragmentation table TAB1, the Boolean variable with the second state TRUE indicates the buffering of the second fragment A1-2 of the third telegram A1. Furthermore, the first distribution node SW1 in the third fragmentation table TAB3 may have set the value of the fragment number FFN for the second fragment A1-2 to one.

However, the first distribution node SW1 does not yet know at point in time T1', i.e. when receiving the first fragment B-1 of the first telegram B which is shown in FIG. 3 with the fifth telegram structure TEL5, that the first telegram B has been fragmented by the second distribution node SW2. Therefore, the first distribution node SW1 first enters the value zero of the fragment number FFN for the second fragment B-2 of the first telegram B into a fourth fragmentation table TAB4 as well as the first state FALSE for the Boolean variable indicating that no buffering is performed:

TABLE 4

|  | A1 | B |
| --- | --- | --- |
| Input/output interface (receipt) | P1 | P2 |
| FRM (receipt) | 0 | 1 |
| Input/output interface (transmit) | P0 | P0 |
| FRM (transmit) | 1 | 3 |
| Priority level | 220 | 200 |
| FFN | 1 | 0 |
| Telegram/Fragment stored | TRUE | FALSE |

In addition, the first distribution node SW1 may set the consecutive number FRM for receiving the third telegram A1to the value zero, analogous to the second fragmentation table TAB2, since the ninth telegram structure TEL9 of FIG. 4 which shows the unfragmented structure of the third telegram A1 does not include a consecutive number FRM. Moreover, the first distribution node SW1 may enter the first and the third priority level 220, 200 into the fourth fragmentation table TAB4.

At a point in time T3, the first distribution node SW1 has received the end of the first fragment B-1 of the first telegram B. Accordingly, the first distribution node SW1 knows from the first fragmentation information 340 of the first fragment B-1 that the second distribution node SW2 fragmented the first telegram B having the first priority level 200. The first distribution node SW1 may further assume that the first distribution node SW1 will receive a higher prioritized telegram than the first telegram B because the first fragment B-1 of the first telegram B is a non-last fragment of the first telegram B which may be recognized by the first fragmentation information 340, comprising the fragment number FFN with the value one, of the first fragment B-1 of the first telegram B.

For this reason, the first distribution node SW1 does not send a telegram or fragment which the first distribution node SW1 has buffered in one of the fragmentation tables, but waits for a specified time period, which is set to a default value and may be increased or decreased, for the second telegram C having the second priority level 210 which comprises the value three and thus has a higher priority than the first priority level 200 which has the value two of the first fragment B-1 of the first telegram B. The above-mentioned predetermined time period allows the first distribution node SW1 (as well as the second distribution node SW2, which may be embodied in a similar way) to wait only for the predetermined time period in order to receive a higher-priority telegram. Thus, the given time duration forms a kind of monitoring time with which a long waiting period in which no telegram transmission takes place may be avoided. After the specified time period has elapsed, the first distribution node SW1 sends the second fragment A1-2 of the third telegram A1 if the first distribution node SW1 has not received a higher-priority telegram on the second input/output interface P2.

The first distribution node SW1 sends the first fragment B-1 of the first telegram B on the first input/output interface P0 of the first distribution node SW1 via the first data transmission link D1 to the first node TN A in the first network segment N1, wherein the first node TN A receives the first fragment B-1 of the first telegram B at a time T1". However, the transmission procedure of the first fragment B-1 does not necessarily have to take place after the first fragment B-1 has been completely received by the first distribution node SW1. Usually, the first distribution node SW1 (as well as the second distribution node SW2) forwards telegrams or fragments before the first distribution node SW1 (or the second distribution node SW2) has completely received the telegrams or fragments. The first fragment B-1 of the first telegram B is in the following referred to as the first fragment B-1' of the first telegram B during the transmission process by the first distribution node SW1 and the receiving process by the first node TN A.

If the first distribution node SW1 has received the first fragmentation symbol E-FRG at the end of the first fragment B-1 of the first telegram B, the first distribution node SW1 may set the consecutive number FRM of the first fragment B-1' to the value three corresponding to the first priority level 200.

Figure 6:
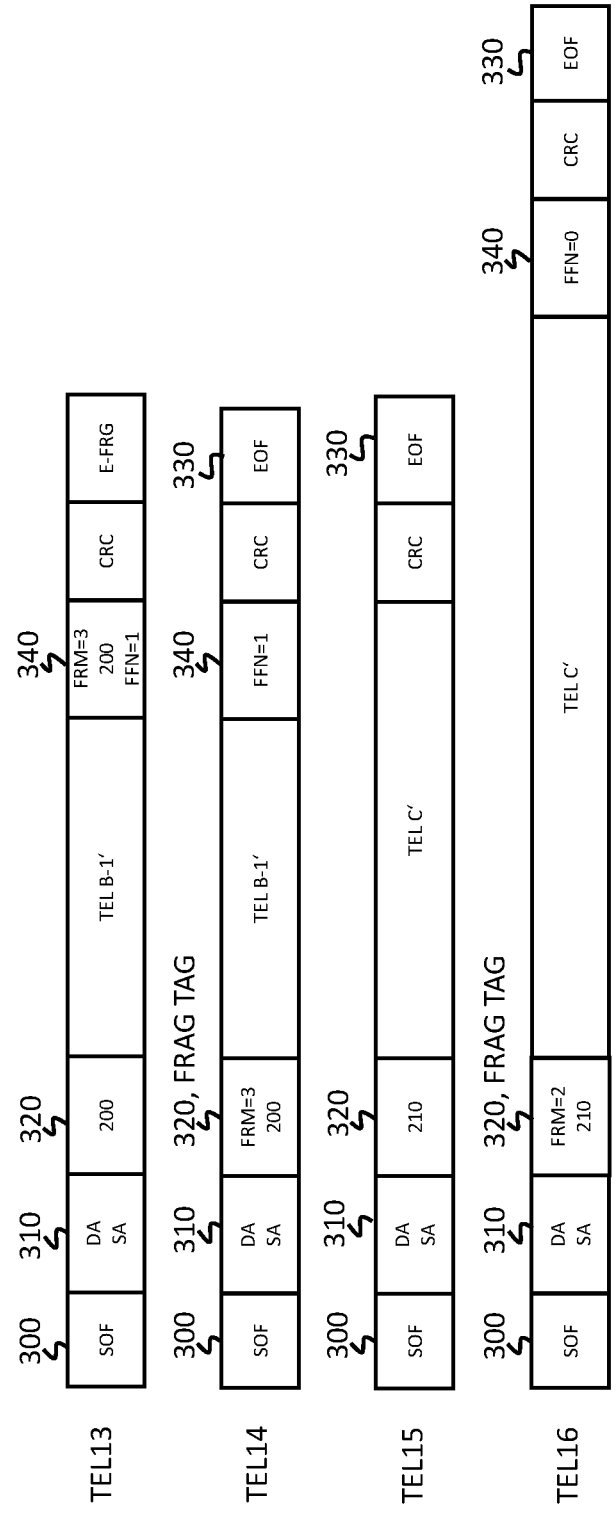
FIG. 6 shows a thirteenth and fourteenth telegram structure of the first fragment of the first telegram and a fifteenth and sixteenth telegram structure of the second unfragmented telegram.

The first fragment B-1' of the first telegram B may have a thirteenth telegram structure TEL13 or, respectively, a fourteenth telegram structure TEL14 as shown in FIG. 6 during the forwarding process. The thirteenth telegram structure TEL13 may be similar to the fifth telegram structure TEL5 of FIG. 3, wherein the thirteenth telegram structure TEL13 differs in the consecutive number FRM of the first fragment B-1' of the first telegram B. In a fifth fragmentation table TAB5, the first distribution node SW1 notes the first fragmentation information 340 with the fragment number FFN of the second fragment B-2 of the first telegram B:

TABLE 5

|  | A1 | B |
|---|---|---|
| Input/output interface (receipt) | P1 | P2 |
| FRM (receipt) | 0 | 1 |
| Input/output interface (transmit) | P0 | P0 |
| FRM (transmit) | 1 | 3 |
| Priority level | 220 | 200 |
| FFN | 1 | 1 |
| Telegram/Fragment stored | TRUE | FALSE |

With the exception of the value of the consecutive number FRM of the first fragment B-1' of the first telegram B, the fourteenth telegram structure TEL14 of FIG. 6 may be embodied analogously to the sixth telegram structure TEL6 of FIG. 3. Therefore, a description of the individual features is not given here. The fragmentation table corresponding to the fourteenth telegram structure TEL14 may be identical to the fifth fragmentation table TAB5 and have the same contents.

The first distribution node SW1 sends the second telegram C having the second priority level 210 to the first sub-scriber TN A on the first input/output interface P0, and may set the consecutive number FRM for the second telegram C to the value two, which has not yet been used for other telegrams or fragments. For this reason, the second tele-gram C is hereinafter referred to as second telegram C' which has been forwarded by the first distribution node SW1. The second telegram C' may have a fifteenth telegram structure TEL15 or a sixteenth telegram structure TEL16 in FIG. 6. The fifteenth telegram structure TEL15 may be similar to the third telegram structure TEL3 in FIG. 3, while the sixteenth telegram structure TEL16 may be similar to the fourth telegram structure TEL4 in FIG. 3. The sixteenth telegram structure TEL16 may differ from the fourth telegram structure TEL4 in the value of the consecutive number FRM in that the first distribution node SW1 sets the consecutive number FRM e.g. to the value two. A sixth fragmentation table TAB6 may look as follows for the sixteenth telegram structure TEL16:

TABLE 6

|  | A1 | B | C (C') |
|---|---|---|---|
| Input/output interface (receipt) | P1 | P2 | P2 |
| FRM (receipt) | 0 | 1 | 2 |
| Input/output interface (transmit) | P0 | P0 | P0 |
| FRM (transmit) | 1 | 3 | 2 |
| Priority level | 220 | 200 | 210 |
| FFN | 1 | 1 | 0 |
| Telegram/Fragment stored | TRUE | FALSE | FALSE |

The description of a further fragmentation table for the fifteenth telegram structure TEL15 is omitted at this point, since it may be embodied analogously to the sixth fragmentation table TAB6. Since the second telegram C' is a non-fragmented telegram, the fragment number FFN may comprise the value zero and therefore no buffering of the second telegram C' is required, which may be indicated by the first state FALSE of the Boolean variable.

At a point in time T4 in FIG. 2, the first distribution node SW1 may receive a fourth telegram A2 having the third priority level 220 with the integer value one on the third input/output interface P1. The fourth telegram A2 has a third priority level 220 with a smaller value than the second priority level 210 of the second telegram C' with the integer value three. For this reason, the first distribution node SW1 continues transmitting the second telegram C' and buffers the fourth telegram A2 in a seventh fragmentation table TAB7 indicated by the second state TRUE of the Boolean variable:

TABLE 7

|  | A1 | B | C (C') | A2 |
|---|---|---|---|---|
| Input/output interface (receipt) | P1 | P2 | P2 | P1 |
| FRM (receipt) | 0 | 1 | 2 | 0 |
| Input/output interface (transmit) | P0 | P0 | P0 | P0 |
| FRM (transmit) | 1 | 3 | 2 | 0 |
| Priority level | 220 | 200 | 210 | 220 |
| FFN | 1 | 1 | 0 | 0 |
| Telegram/Fragment stored | TRUE | FALSE | FALSE | TRUE |

The first distribution node SW1 sets the consecutive number FRM (transmit) for the fourth telegram A2 to the value zero since the first distribution node SW1 has not yet sent the fourth telegram A2.

At a point in time T6 in FIG. 2, the first distribution node SW1 has received the second telegram C completely. Using the seventh fragmentation table TAB7, the first distribution node SW1 recognizes that the highest prioritized buffered fragment is the second fragment A1-2 of the third telegram A1, wherein the first fragment A1-1 of the third telegram A1 may already have been completely forwarded by the first distribution node SW1. However, since the seventh fragmentation table TAB7 still stores the information on the higher prioritized first telegram B, the first distribution node SW1 does not transmit the stored second fragment A1-2 of the third telegram A1 but waits for the receipt of the second fragment B-2 of the first telegram B for the predetermined time period described above. In this case, as explained above, if the first distribution node SW1 does not receive the second fragment B-2 of the first telegram B within the specified time, the first distribution node SW1 would continue sending the second fragment A1-2 of the third telegram A1. In this case, however, the first distribution node SW1 receives the second fragment B-2 of the first telegram B within the specified time.

Figure 7:
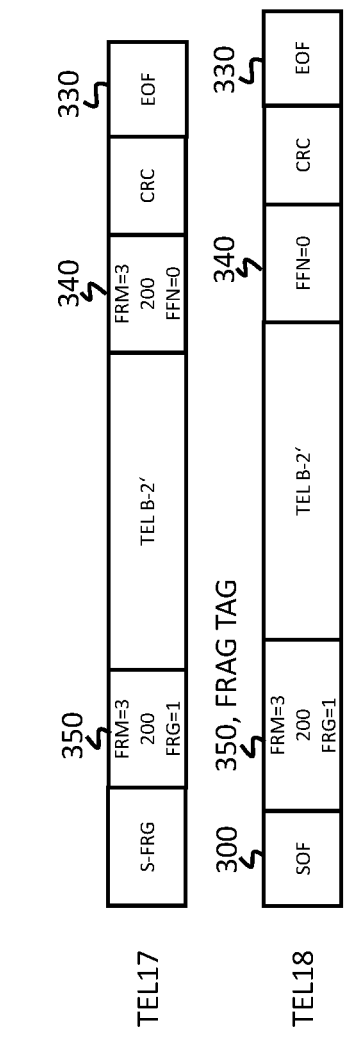
FIG. 7 depicts a seventeenth and eighteenth telegram structure of a forwarded second fragment of the first telegram.

The first distribution node SW1 forwards the second fragment B-2 of the first telegram B to the first subscriber TN A. The second fragment B-2, which is referred to as second fragment B-2' in the following, may have a seventeenth telegram structure TEL17 or an eighteenth telegram structure TEL18 as shown in FIG. 7. The seventeenth telegram structure TEL17 may be structured analogously to the seventh telegram structure TEL7 in FIG. 4, likewise the eighteenth telegram structure TEL18 may be structured analogously to the eighth telegram structure TEL8 in FIG. 4. Differences in the seventeenth telegram structure TEL17 and the seventh telegram structure TEL7 may result from the different values of the consecutive numbers FRM. In this case, the first distribution node SW1 may have set the value of the consecutive number FRM for the second fragment B-2' of the first telegram B to the value three, whereas the second distribution node SW2 in FIG. 4 may have set the value of the consecutive number FRM for the second fragment B-2 to the value one. In an eighth fragmentation table TAB8, the first distribution node SW1 may store the value of the consecutive number FRM for the second fragment B-2' and may also delete the entry for the second telegram C' from the eighth fragmentation table TAB8:

TABLE 8

|  | A1 | B | A2 |
|---|---|---|---|
| Input/output interface (receipt) | P1 | P2 | P1 |
| FRM (receipt) | 0 | 1 | 0 |
| Input/output interface (transmit) | P0 | P0 | P0 |
| FRM (transmit) | 1 | 3 | 2 |
| Priority level | 220 | 200 | 220 |
| FFN | 1 | 1 | 0 |
| Telegram/Fragment stored | TRUE | FALSE | TRUE |

At a point in time T7 in FIG. 2, the first distribution node SW1 may have completely forwarded the second fragment B-2' of the first telegram B to the first subscriber TN A. Accordingly, the first distribution node SW1 may delete the entry for the first telegram B from the eighth fragmentation table TAB8. Consequently, a ninth fragmentation table TAB5 may contain the following contents:

TABLE 9

|  | A1 | A2 |
|---|---|---|
| Input/output interface (receipt) | P1 | P1 |
| FRM (receipt) | 0 | 0 |
| Input/output interface (transmit) | P0 | P0 |
| FRM (transmit) | 1 | 2 |
| Priority level | 220 | 220 |
| FFN | 1 | 0 |
| Telegram/Fragment stored | TRUE | TRUE |

The first distribution node SW1 may recognize from the ninth fragmentation table TAB5 that the stored second fragment A1-2 of the third telegram A1 as well as the stored fourth telegram A2 have the same third priority level 220 with the integer value one. Consequently, the first distribution node SW1 may first send the second fragment A1-2 of the third telegram A1 on the first input/output interface P0 since the first distribution node SW1 may have received this fragment before the fourth telegram A2 on the third input/output interface P1.

Figure 8:
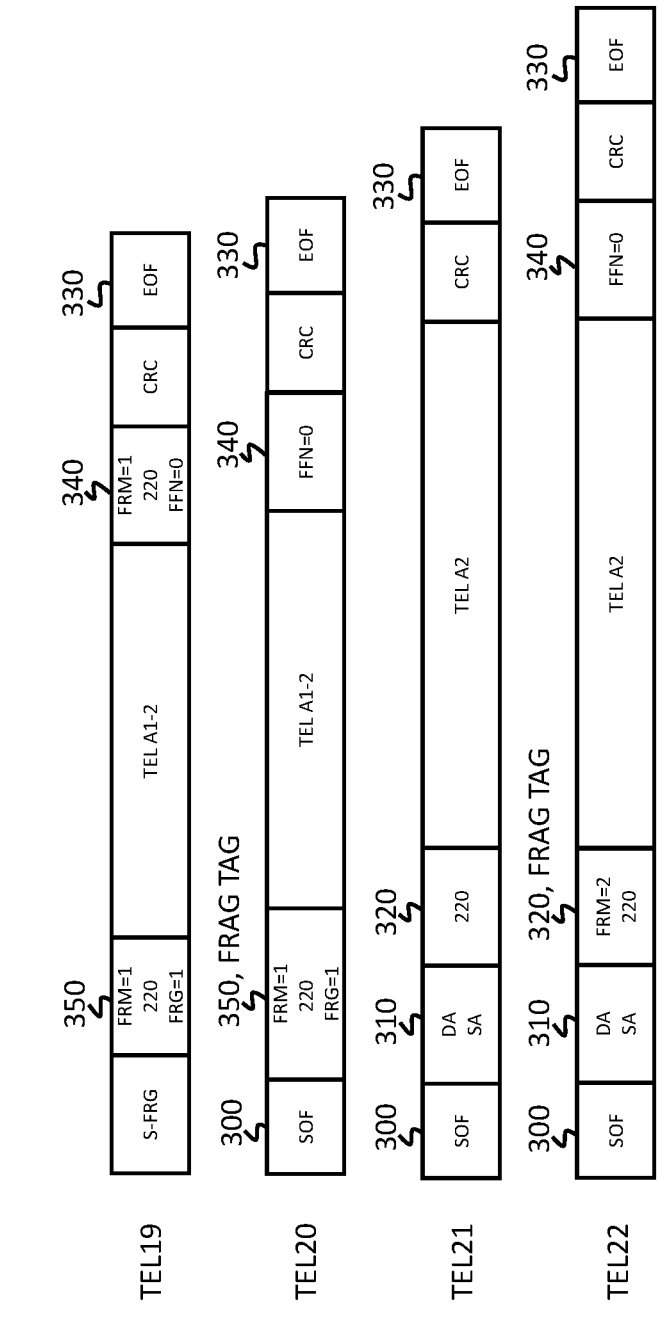
FIG. 8 shows a nineteenth and twentieth telegram structure of a second fragment of the third telegram, and a twenty-first and twenty-second telegram structure of a fourth unfragmented telegram.

FIG. 8 shows a nineteenth telegram structure TEL19 and a twentieth telegram structure TEL20, which the second fragment A1-2 of the third telegram A1 may have during the forwarding process. The nineteenth telegram structure TEL19 may be similar to the seventh telegram structure TEL7 in FIG. 4, since both telegram structures are a second fragment of a telegram, wherein the same conditions and characteristics apply to the nineteenth telegram structure TEL19 as described above in connection with the seventh telegram structure TEL7.

The twentieth telegram structure TEL20 may be embodied analogously to the eighth telegram structure TEL8 of FIG. 4, since these are also telegram structures of a second fragment of a telegram. For this reason, the conditions and features explained above in connection with the eighth telegram structure TEL8 apply to the twentieth telegram structure TEL20. The above-mentioned telegram structures may each have the same consecutive number FRM, since the corresponding second fragments of the telegrams are respectively transmitted by the first and second distribution nodes SW1, SW2 on different data transmission links.

At a point in time T8 in FIG. 2, the first distribution node SW1 may have completely transmitted the second fragment A1-2 of the third telegram A1 to the first subscriber TN A. Accordingly, the first distribution node SW1 may remove the entry of the third telegram A1 from the ninth fragmentation table TAB5 and may generate a tenth fragmentation table TAB10:

TABLE 10

|  | A2 |
|---|---|
| Input/output interface (receipt) | P1 |
| FRM (receipt) | 0 |
| Input/output interface (transmit) | P0 |
| FRM (transmit) | 2 |
| Priority level | 220 |
| FFN | 0 |
| Telegram/Fragment stored | TRUE |

Finally, the first distribution node SW1 sends the fourth telegram A2 via the first input/output interface P0 to the first subscriber TN A, wherein the fourth telegram A2 may have a twenty-first telegram structure TEL21 or a twenty-second telegram structure TEL22 of FIG. 8. For example, the fourth telegram A2 may be forwarded to the first subscriber TN A without having been fragmented by the first distribution node SW1. Accordingly, the twenty-first telegram TEL21 may have the same structure as the first telegram TEL1 in FIG. 3, and the twenty-second telegram TEL22 may have an embodiment analogous to the second telegram TEL2 in FIG. 3, since in each case the telegram is not fragmented. Therefore, the features and conditions mentioned above in connection with the first and second telegram structure TEL1, TEL2 also apply to the twenty-first and twenty-second telegram structure TEL21, TEL22.

After the first distribution node SW1 has completely transmitted the fourth telegram A2 with the twenty-first telegram structure TEL21 or the twenty-second telegram structure TEL22 to the first subscriber TN A, the first distribution node SW1 may delete the entry via the fourth telegram A2 from the tenth fragmentation table TAB10. The first subscriber TN A may reassemble the individual received fragments of the telegrams on the basis of the first and second fragmentation information 340, 350 which comprise the individual fragments since the first and second fragmentation information 340, 350 may allow an assignment of the individual fragments to a complete telegram, wherein the first fragmentation information 340 may refer to the second fragmentation information 350 and vice versa. Alternatively, the first distribution node SW1 may assemble the individual fragments of the telegrams and forward them to the first subscriber TN A.

The fragment number FFN of the second fragment of the respective telegram may be embodied as another consecutive number just like the consecutive number FRM. The consecutive number FRM as well as the second fragmentation information 350 comprising the fragment number FRG, which may have the value of the fragment number FFN of the first fragment of the telegram, may be used to detect errors during data transmission of the individual telegram fragments. If, on the other hand, the receiving subscriber is able to perform comparable error detection mechanisms in order to detect a missing fragment during the transmission process, the individual fragments may also be unambiguously assigned via the priority level assigned to them, and the use of the fragment number FFN and the fragment number FRG may be dispensed with.

The first distribution node SW1 and/or the second distribution node SW2 may keep the consecutive number FRM for the transmission process (FRM transmit) of a telegram at the same value as the value of the consecutive number during receipt of the respective telegram, but under the restriction that no two telegrams with the same formed valence and the same formed values of the priority level and the same value of the consecutive number FRM have not yet been completely transmitted by the first distribution node SW1 and/or the second distribution node SW2. This is because the combination of the consecutive number FRM and the value of the priority level of the telegram must be unique for all telegrams which have not yet been completely sent by the first distribution node SW1 and/or the second distribution node SW2 at a point in time via the first input/output interface P0, which is e.g. provided for the first distribution node SW1 and the second distribution node SW2 as the transmission interface.

The individual first to fourth subscribers TN A-TN D in the automation communication network 100 may each be subscribers that may process fragmented telegrams and reassemble the corresponding fragments of the telegrams to result in a complete telegram by the first and second fragmentation information 340, 350. Furthermore, the two distribution nodes SW1, SW2 may be embodied as distribution nodes that do not require the complete header of the telegrams and fragments for forwarding or, respectively, processing the telegrams and fragments.

The present invention was described in detail by preferred embodiment examples. Instead of the described embodiment examples, further embodiment examples are conceivable which may have further modifications or combinations of described features. For this reason, the present invention is not limited to the disclosed examples, since other variations may be devised by a person skilled in the art without exceeding the protective scope of the invention.

TABLE A

List of References

| | |
|---|---|
| SW1 first distribution node | EOF end symbol |
| SW2 second distribution node | CRC checksum field |
| N1 first network segment | DA target address |
| N2 second network segment | SA sender address |
| N3 third network segment | ET type field |
| N4 fourth network segment | FRAG TAG fragmentation TAG |
| TN A first subscriber | FRM consecutive number |
| TN B second subscriber | FFN fragment number |
| TN C third subscriber | E-FRG first fragmentation symbol |
| TN D fourth subscriber | S-FRG second fragmentation symbol |
| P0 first input/output interface | FRG number of fragments |
| P2 second input/output interface | FA fragment target address |
| P1 third input/output interface | PAD-LEN filler byte data field |
| t time line | VLAN TAG additional data field |
| B first telegram | 100 automation communication network |
| C second telegram | 200 first priority level |
| A1 third telegram | 210 second priority level |
| A2 fourth telegram | 220 third priority level |
| TEL B user data section of first telegram | 300 first data field |
| TEL C user data section of second telegram | 310 second data field |
| TEL A1 user data section of third telegram | 320 third data field |
| TEL A2 user data section of fourth telegram | 330 fourth data field |
| | 340 first fragmentation information |

TABLE B

Additional References

| | |
|---|---|
| B-1 first fragment of first telegram | TEL 11 eleventh telegram structure |
| B-2 second fragment of first telegram | TEL 12 twelfth telegram structure |
| A1-1 first fragment of third telegram | TEL 13 thirteenth telegram structure |
| B-1' forwarded first fragment of first telegram | TEL 14 fourteenth telegram structure |
| C' forwarded second telegram | TEL 15 fifteenth telegram structure |
| B-2' forwarded second fragment of first telegram | TEL 16 sixteenth telegram structure |
| A1-2 second fragment of third telegram | TEL 17 seventeenth telegram structure |
| TEL B-1 user data section of first fragment of first telegram | TEL 18 eighteenth telegram structure |
| TEL B-2 user data section of second fragment of first telegram | TEL 19 nineteenth telegram structure |
| TEL A1-1 user data section of first fragment of third telegram | TEL20 twentieth telegram structure |
| TEL B-1' user data section of forwarded first fragment of first telegram | TEL21 twenty-first telegram structure |
| TEL C' user data section of forwarded second telegram | TEL22 twenty-second telegram structure |
| TEL B-2' user data section of forwarded second fragment of first telegram | FALSE first state of a Boolean variable |
| TEL A1-2 user data section of second fragment of third telegram | TRUE second state of a Boolean variable |
| TEL1 first telegram structure | TAB1 first fragmentation table |
| TEL2 second telegram structure | TAB2 second fragmentation table |
| TEL3 third telegram structure | TAB3 third fragmentation table |
| TEL4 fourth telegram structure | TAB4 fourth fragmentation table |
| TEL5 fifth telegram structure | TAB5 fifth fragmentation table |
| TEL6 sixth telegram structure | TAB6 sixth fragmentation table |
| TEL7 seventh telegram structure | TAB7 seventh fragmentation table |
| TEL8 eighth telegram structure | TAB8 eighth fragmentation table |
| TEL9 ninth telegram structure | TAB9 ninth fragmentation table |
| TEL10 tenth telegram structure | TAB10 tenth fragmentation table |

What is claimed is:

1. A method for transmitting data in an automation communication network comprising at least one distribution node having a plurality of input/output interfaces each of which is connected to a network segment,
   wherein the network segment comprises at least one subscriber,
   wherein data exchange between the subscribers takes place in the form of telegrams,
   wherein priority levels are assigned to the telegrams,
   wherein a telegram having a first priority level is configured as an acyclic non-real-time telegram, including acyclic parameters or status data of the at least one subscriber, and wherein a telegram having a second priority level is configured as a cyclic real-time telegram relevant for the control of an automation system, including cyclic input and/or output data of the at least one subscriber,
   wherein transmission of a telegram having the first priority level on an input/output interface is interrupted by the at least one distribution node when the at least one distribution node has received a telegram having the second priority level which comprises a higher valence than the first priority level, on a further input/output interface,
   wherein said at least one distribution node completes the interrupted telegram having the first priority level forming a first fragment in a defined manner by said at least one distribution node transmitting a first fragmentation information at the end of said first fragment,
   wherein a remaining portion of the telegram having the first priority level, which has not yet been transmitted by the at least one distribution node, forms a second fragment,
   wherein the at least one distribution node generates a second fragmentation information for the second fragment,
   wherein the at least one distribution node buffers the second fragment together with the second fragmentation information,
   wherein the first fragmentation information comprises a fragment number of the second fragment and the second fragmentation information comprises a fragment number of the first fragment,
   wherein the first fragmentation information additionally comprises a value of a priority level of the first fragment as well as a consecutive number for the first fragment and wherein the second fragmentation information additionally comprises a value of a priority level of the second fragment and a consecutive number for the second fragment,
   wherein the consecutive numbers for the first and second fragments are adapted to be regenerated for each input/output interface of the at least one distribution node on which said at least one distribution node forwards the telegrams and fragments,
   wherein the at least one distribution node, after sending of the telegram having the second priority level on the input/output interface, transmits the second fragment of the telegram having the first priority level together with the second fragmentation information on the input/output interface, and
   wherein an addressed subscriber, for which the telegram having the first priority level is intended, reassembles the first fragment and the second fragment of the telegram having the first priority level on the basis of the first and second fragmentation information.

2. The method according to claim 1,
   wherein said at least one distribution node sends a checksum field at the end of said first fragment, and
   wherein the checksum field has a checksum calculated over the already sent part of the first fragment.

3. The method according to claim 1,
   wherein the first fragmentation information comprises the fragment number of the second fragment, and
   wherein the at least one distribution node indicates the first fragment of the interrupted telegram having the first priority level by a first fragmentation symbol at the end of the interrupted telegram.

4. The method according to claim 3,
   wherein the second fragment of the telegram having the first priority level is divided up into at least two sub-fragments,
   wherein a first sub-fragment of the telegram with the first priority level has a second fragmentation symbol and the second fragmentation information at the beginning of the first sub-fragment,
   wherein the second fragmentation information comprises a fragment number having the value of the fragment number of the first fragment,
   wherein the first sub-fragment comprises the first fragmentation information at the end of the first sub-fragment comprising the fragment number of a second sub-fragment, and
   wherein the first sub-fragment has the first fragmentation symbol at the end of the first sub-fragment.

5. The method according to claim 4,
   wherein the second sub-fragment of the telegram having the first priority level comprises the second fragmentation symbol and the second fragmentation information at the beginning of the second sub-fragment,
   wherein the second fragmentation information of the second sub-fragment has the fragment number with the value of the fragment number of the first sub-fragment, and
   wherein the second sub-fragment of the telegram with the first priority level is marked with the value zero of the fragment number of the first fragmenting information at the end of the second sub-fragment.

6. The method according to claim 1,
   wherein a possible fragmentation of the telegram having the first priority level is indicated by setting a fragmentation TAG at the beginning of the telegram having the first priority level,
   wherein the fragmentation TAG has a type field for a protocol used within user data of the first fragment,
   wherein the at least one distribution node interrupts the telegram with the first priority level in such a way that the interrupted telegram which forms the first fragment of the telegram has a minimum length during the interruption process,
   wherein the fragmentation of the telegram having the first priority level is indicated at the end of the first fragment with the first fragmentation information, and
   wherein the first fragmentation information comprises a fragment number of the second fragment.

7. The method according to claim 6,
   wherein the second fragment of the telegram having the first priority level is divided up into at least two sub-fragments,
   wherein a first sub-fragment at the beginning of the first sub-fragment has a fragment target address comprising a second fragmentation information having a fragment number with the value of the fragment number of the first fragment, wherein a plurality of subscribers may be addressed via the fragment target address, and wherein the first sub-fragment of the telegram comprises the first fragmenting information with the fragment number of a second sub-fragment at the end of the first sub-fragment.

8. The method according to claim 7, wherein the fragment target address comprises a sender address, a target address and the fragmentation TAG at the beginning of the first sub-fragment, and wherein the fragment target address comprises an additional data field if the telegram comprises the additional data field.

9. The method according to claim 8, wherein the second sub-fragment of the telegram having the first priority level has filler bytes if the second sub-fragment falls below the minimum length, wherein the insertion of filler bytes is indicated by setting the fragment number value of the first frag-mentation information of the second sub-fragment to a value PAD at the end of the second sub-fragment, and wherein the second sub-fragment has a filler byte data field at the end of the second sub-fragment comprising the number of filler bytes.

10. The method according to claim 1, wherein the telegram with the first priority level is configured as an Ethernet telegram.

11. An automation communication network, comprising:
at least one distribution node having a plurality of input/output interfaces each of which is connected to a network segment, wherein the network segment comprises at least one subscriber, wherein data exchange between the subscribers takes place in the form of telegrams, wherein priority levels are assigned to the telegrams, wherein a telegram having a first priority level is configured as an acyclic non-real-time telegram, including acyclic parameters or status data of the at least one subscriber, and wherein a telegram having a second priority level is configured as a cyclic real-time telegram relevant for the control of an automation system, including cyclic input and/or output data of the at least one subscriber, wherein the at least one distribution node is configured to interrupt transmission of a telegram having the first priority level on an input/output interface if the at least one distribution node has received a telegram with the second priority level, which comprises a higher valence than the first priority level, on a further input/output interface, wherein said at least one distribution node is configured to complete the interrupted telegram having the first priority level forming a first fragment in a defined manner by said at least one distribution node sending a first fragmentation information at the end of said first fragment, wherein a remaining portion of the telegram having the first priority level, which has not yet been transmitted by the at least one distribution node, forms a second fragment, wherein the at least one distribution node is adapted to generate second fragmentation information for the second fragment, wherein the at least one distribution node is configured to buffer the second fragment together with the second fragmentation information, wherein the first fragmentation information comprises a fragment number of the second fragment and the second fragmentation information comprises a fragment number of the first fragment, wherein the first fragmentation information additionally comprises a value of a priority level of the first fragment as well as a consecutive number for the first fragment and wherein the second fragmentation information additionally comprises a value of a priority level of the second fragment and a consecutive number for the second fragment, wherein the consecutive numbers for the first and second fragments are adapted to be regenerated for each input/output interface of the at least one distribution node on which said at least one distribution node forwards the telegrams and fragments, wherein said at least one distribution node is configured to transmit, after transmitting the telegram having the second priority level on the input/output interface, the second fragment of the telegram with the first priority level together with the second fragmentation information on the input/output interface, and wherein an addressed subscriber, for which the telegram having the first priority level is intended, reassembles the first fragment and the second fragment of the telegram having the first priority level on the basis of the first and second fragmentation information.

12. The automation communication network according to claim 11, wherein the at least one distribution node is configured to transmit a checksum field at the end of the first fragment, and wherein the checksum field comprises a checksum which the at least one distribution node calculates over the already transmitted part of the first fragment.

13. The automation communication network according to claim 11, wherein the first fragmentation information comprises the fragment number of the second fragment, and wherein the at least one distribution node is adapted to indicate the first fragment of the interrupted telegram having the first priority level by a first fragmentation symbol at the end of the interrupted telegram.

14. The automation communication network according to claim 13, wherein the at least one distribution node is configured to divide up the second fragment of the telegram having the first priority level into at least two sub-fragments, wherein a first sub-fragment of the telegram having the first priority level has a second fragmentation symbol and the second fragmentation information at the beginning of the first sub-fragment, wherein the second fragmentation information comprises a fragment number having the value of the fragment number of the first fragment, wherein the first sub-fragment has the first fragmenting information at the end of the first sub-fragment comprising the fragment number of a second sub-fragment, and wherein the first sub-fragment has the first fragmenting symbol at the end of the first sub-fragment.

15. The automation communication network according to claim 14,
- wherein the second sub-fragment of the telegram having the first priority level comprises the second fragmentation symbol and the second fragmentation information at the beginning of the second sub-fragment,
- wherein the second fragmentation information of the second sub-fragment has the fragment number with the value of the fragment number of the second sub-fragment, and
- wherein the at least one distribution node is configured to indicate the second sub-fragment with the value zero of the fragment number of the first fragmenting information at the end of the second sub-fragment.

16. The automation communication network according to claim 11,
- wherein the at least one distribution node is configured to indicate a possible fragmentation of the telegram having the first priority level by the at least one distribution node setting a fragmentation TAG at the beginning of the telegram with the first priority level,
- wherein the fragmentation TAG comprises a type field for a protocol used within user data of the first fragment,
- wherein the at least one distribution node is adapted to interrupt the telegram having the first priority level in such a way that the interrupted telegram, which forms the first fragment of the telegram, has a minimum length during the interruption process,
- wherein the at least one distribution node is configured to indicate the fragmentation of the telegram having the first priority level at the end of the first fragment with the first fragmentation information, and
- wherein the first fragmentation information comprises a fragment number of the second fragment.

17. The automation communication network according to claim 16,
- wherein the at least one distribution node is configured to divide up the second fragment of the telegram having the first priority level into at least two sub-fragments,
- wherein a first sub-fragment of said telegram has a fragment target address at the beginning of said first sub-fragment, comprising a second fragmentation information having a fragment number with the value of the fragment number of said first fragment,
- wherein a plurality of subscribers may be addressed via the fragment target address, and
- wherein the first sub-fragment of the telegram comprises the first fragmenting information with the fragment number of a second sub-fragment at the end of the second sub-fragment.

18. The automation communication network according to claim 17,
- wherein the fragment target address comprises a sender address, a target address and the fragmentation TAG at the beginning of the first sub-fragment, and
- wherein the fragment target address comprises an additional data field if the telegram comprises the additional data field.

19. The automation communication network according to claim 18,
- wherein the second sub-fragment has filler bytes if the second sub-fragment is shorter than the minimum length,
- wherein the at least one distribution node is configured to indicate the insertion of filler bytes by the at least one distribution node setting the value of the fragment number of the first fragmentation information of the second sub-fragment to a value PAD at the end of the second sub-fragment, and
- wherein the second sub-fragment has a filler byte data field at the end of the second sub-fragment comprising the number of filler bytes.

20. A distribution node, having:
- input/output interfaces, for an automation communication network,
- wherein data exchange between subscribers of the automation communication network takes place in the form of telegrams with assigned priority levels,
- wherein a telegram having a first priority level is configured as an acyclic non-real-time telegram, including acyclic parameters or status data of the at least one subscriber, and wherein a telegram having a second priority level is configured as a cyclic real-time telegram relevant for the control of an automation system, including cyclic input and/or output data of the at least one subscriber,
- wherein the distribution node interrupts transmission of a telegram having the first priority level on an input/output interface, when the distribution node has received a telegram having the second priority level which comprises a higher valence than the first priority level, on a further input/output interface,
- wherein said distribution node completes the interrupted telegram having the first priority level forming a first fragment in a defined manner by said distribution node transmitting a first fragmentation information at the end of said first fragment,
- wherein a remaining portion of the telegram having the first priority level, which has not yet been transmitted by the distribution node, forms a second fragment,
- wherein the distribution node generates a second fragmentation information for the second fragment,
- wherein the distribution node buffers the second fragment together with the second fragmentation information,
- wherein the first fragmentation information comprises a fragment number of the second fragment and the second fragmentation information comprises a fragment number of the first fragment, wherein the first fragmentation information additionally comprises a value of a priority level of the first fragment as well as a consecutive number for the first fragment and wherein the second fragmentation information additionally comprises a value of a priority level of the second fragment and a consecutive number for the second fragment,
- wherein the consecutive numbers for the first and second fragments are adapted to be regenerated for each input/output interface of the at least one distribution node on which said at least one distribution node forwards the telegrams and fragments, and
- wherein the distribution node, after sending of the telegram having the second priority level on the input/output interface, transmits the second fragment of the telegram having the first priority level together with the second fragmentation information on the input/output interface.

* * * * *